(12) United States Patent
Suzuki et al.

(10) Patent No.: US 11,760,302 B2
(45) Date of Patent: Sep. 19, 2023

(54) FRONT AIRBAG WITH HOLLOW PORTION

(71) Applicant: TOYODA GOSEI CO., LTD., Kiyosu (JP)

(72) Inventors: Yuya Suzuki, Kiyosu (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/538,257

(22) Filed: Nov. 30, 2021

(65) Prior Publication Data

US 2022/0169199 A1 Jun. 2, 2022

(30) Foreign Application Priority Data

Dec. 1, 2020 (JP) ................................. 2020-199603

(51) Int. Cl.
*B60R 21/239* (2006.01)
*B60R 21/2334* (2011.01)
(Continued)

(52) U.S. Cl.
CPC ........ *B60R 21/239* (2013.01); *B60R 21/2334* (2013.01); *B60R 21/205* (2013.01);
(Continued)

(58) Field of Classification Search
CPC ... B60R 21/205; B60R 21/231; B60R 21/233; B60R 21/2334; B60R 21/2338;
(Continued)

(56) References Cited

U.S. PATENT DOCUMENTS 3,733,091 A * 5/1973 Fleck .................... B60R 21/231
280/729
3,762,741 A * 10/1973 Fleck .................... B60R 21/231
137/849
(Continued)

FOREIGN PATENT DOCUMENTS

JP H06-344844 A 12/1994
JP 2007106376 A * 4/2007 ........... B60R 21/231
(Continued)

OTHER PUBLICATIONS

Office Action dated Jun. 20, 2023 in corresponding Japanese Patent Application No. 2020-199603 (and English machine translation).

*Primary Examiner* — Laura Freedman
(74) *Attorney, Agent, or Firm* — POSZ LAW GROUP, PLC

(57) ABSTRACT

An airbag includes: a bag main body: and regulating units configured to regulate an expansion completed shape of the bag main body. The bag main body has an expansion completed shape as a substantially square cylindrical shape, where a hollow portion which penetrates substantially along a left-right direction is provided and a circumference of the hollow portion is surrounded by an upper expansion portion and a lower expansion portion and a front expansion portion and a rear expansion portion. The regulating units are arranged at a plurality of horizontally symmetrical locations centered on a center of the bag main body on the left-right directional side and each of the regulating units is configured to straddle the hollow portion when viewed from a lateral side in the left-right direction and at least an upper edge side and a lower edge side are connected to the bag main body side.

8 Claims, 16 Drawing Sheets

(51) Int. Cl.
*B60R 21/205* (2011.01)
*B60R 21/233* (2006.01)
*B60R 21/231* (2011.01)

(52) U.S. Cl.
CPC .............. *B60R 2021/2395* (2013.01); *B60R 2021/23115* (2013.01); *B60R 2021/23324* (2013.01)

(58) Field of Classification Search
CPC ......... B60R 21/239; B60R 2021/23115; B60R 2021/23308; B60R 2021/23324; B60R 2021/23382; B60R 2021/2395
See application file for complete search history.

(56) References Cited

U.S. PATENT DOCUMENTS

| | | | | |
|---|---|---|---|---|
| 3,784,225 A | * | 1/1974 | Fleck | B60R 21/231 |
| | | | | 280/729 |
| 3,907,327 A | * | 9/1975 | Pech | B60R 21/23 |
| | | | | 280/743.2 |
| 3,929,350 A | * | 12/1975 | Pech | B60R 21/231 |
| | | | | 280/729 |
| 5,427,410 A | * | 6/1995 | Shiota | B60R 21/231 |
| | | | | 280/743.1 |
| 8,240,705 B2 | * | 8/2012 | Ishida | B60R 21/231 |
| | | | | 280/743.1 |
| 8,511,710 B2 | * | 8/2013 | Fukawatase | B60R 21/205 |
| | | | | 280/743.1 |
| 10,703,320 B2 | * | 7/2020 | Farooq | B60R 21/231 |
| 10,843,654 B2 | * | 11/2020 | Wiscombe | B60R 21/207 |
| 11,186,248 B2 | * | 11/2021 | Tanaka | B60R 21/01512 |
| 11,299,122 B2 | * | 4/2022 | Choi | B60R 21/2338 |
| 11,491,943 B2 | * | 11/2022 | Tanaka | B60R 21/233 |
| 2011/0101655 A1 | | 5/2011 | Ishida | |
| 2017/0361800 A1 | | 12/2017 | Ohachi et al. | |
| 2020/0122678 A1 | | 4/2020 | Tanaka et al. | |
| 2021/0300282 A1 | * | 9/2021 | Tanaka | B60R 21/2338 |
| 2022/0169195 A1 | * | 6/2022 | Suzuki | B60R 21/205 |

FOREIGN PATENT DOCUMENTS

| | | | |
|---|---|---|---|
| JP | 2011-057142 A | | 3/2011 |
| JP | 2011121581 A | * | 6/2011 |
| JP | 2011168128 A | * | 9/2011 |
| JP | 2017-222331 A | | 12/2017 |
| JP | 2018-158728 A | | 10/2018 |
| JP | 2020-063019 A | | 4/2020 |
| JP | 2021054099 A | * | 4/2021 |

* cited by examiner

FRONT AIRBAG WITH HOLLOW PORTION

CROSS-REFERENCE TO RELATED APPLICATIONS

This application is based upon and claims the benefit of priority from prior Japanese patent application No. 2020-199603 filed on Dec. 1, 2020, the entire contents of which are incorporated herein by reference.

BACKGROUND

1. Field of the Invention

The present invention relates to an airbag which is folded and accommodated in front of an occupant seated on a seat in a vehicle and is configured to allow expansion gas to flow into the inside and be developed and expanded so as to protrude from an accommodation part toward a rear side to be able to protect the occupant.

2. Description of the Related Art

In the related art, as an airbag, there is an airbag having a configuration in which the airbag is expanded in a loop shape so that a hollow portion penetrating substantially along a left-right direction is placed substantially in a center of the top, bottom, front, and back when expansion is completed (for example, see JP-A-2020-63019). In the passenger seat airbag of the related art, a regulation unit for connecting an upper side portion and a lower side portion is arranged so as to regulate a separation distance between the upper side portion located above the hollow portion and the lower side portion located below the hollow portion when expansion is complete.

In the airbag of the related art, the upper side portion and the lower side portion are connected by using a connecting unit, and thus it is configured to suppress excessive separation between the upper side portion and the lower side portion at the time of development and expansion and suppress expansion while greatly swinging in an up-down direction side. However, in the airbag of the related art, the regulating unit is arranged only in one place near a center of the left and right. Therefore, there is room for improvement in that the swing is suppressed almost evenly over a wide range to the left and right at the time of development and expansion.

SUMMARY

The invention is made to solve the problems described above and an object of the invention is to provide an airbag which can be expanded by suppressing swinging almost evenly in a wide range to the left and right.

According to an aspect of the present invention, there is provided an airbag, which is folded and accommodated in front of an occupant seated on a seat in a vehicle and is configured to allow expansion gas to flow into the inside and be developed and expanded so as to protrude from an accommodation part toward a rear side to be able to protect the occupant, the airbag including: a bag main body configured to be expanded by inflowing expansion gas into the inside; and a plurality of regulating units configured to regulate an expansion completed shape of the bag main body, where: the bag main body has an expansion completed shape as a substantially square cylindrical shape, where a hollow portion which penetrates substantially along a left-right direction is provided and a circumference of the hollow portion is surrounded by an upper expansion portion and a lower expansion portion arranged substantially along a front-rear direction on both upper and lower sides and a front expansion portion and a rear expansion portion arranged substantially along an up-down direction on both front and rear sides, and the rear expansion portion arranged on the occupant side when expansion is completed is defined as an occupant protection portion capable of protecting the occupant and a mounting portion to be attached to the accommodation part side is arranged on a front end side when the expansion is completed; and the regulating units are arranged at a plurality of horizontally symmetrical locations centered on a center of the bag main body on the left-right directional side and each of the regulating units is configured to straddle the hollow portion when viewed from a lateral side in the left-right direction and at least an upper edge side and a lower edge side are connected to the bag main body side.

In the airbag of the invention, when the expansion is completed, if the airbag is viewed from the lateral side in the left-right direction, the regulating units of which at least the upper edge side and the lower edge side are connected to the bag main body side (upper expansion portion and lower expansion portion) so as to straddle the hollow portion are arranged at a plurality of horizontally symmetrical locations centered on the center of the bag main body on the left-right directional side. Therefore, at an initial stage of expansion, it is possible to accurately suppress the development of the bag main body in a wide range in the left-right direction so as to separate the upper expansion portion and the lower expansion portion, and thus the bag main body can be expanded by suppressing the swing almost evenly over a wide range in the left-right direction and the bag main body which completes the expansion can stably protect the occupant. Further, in the airbag of the invention, the bag main body which expands by inflowing expansion gas into the inside is configured to have the expansion completed shape having a substantially square annular shape with the hollow portion which penetrates the bag main body substantially along the left-right direction and the rear expansion portion placed behind the hollow portion when the expansion is completed is used as the occupant protection portion capable of protecting the occupant. That is, in the airbag of the invention, although the occupant protection portion is arranged in a substantially plate shape separately from the mounting portion to be attached to the accommodation part side, the upper end side and the lower end side of the occupant protection portion are supported by the upper expansion portion and the lower expansion portion which are arranged substantially along the front-rear direction when the expansion is completed. Therefore, the occupant moving forward can be stably received by the occupant protection portion. Further, the upper expansion portion and the lower expansion portion which support the occupant protection portion are connected to each other at a plurality of locations separated in the left-right direction by regulating members. Therefore, when the occupant protection portion receives the occupant, the deformations that are separated from each other and that reduce a reaction force are also regulated in a wide range in the left-right direction. Therefore, even when it is configured to be separated from the mounting portion and have the hollow portion therebetween, the forward-moving occupant can be stably restrained by the occupant protection portion.

Therefore, in the airbag of the invention, it is possible to suppress the swing almost evenly over a wide range in the left-right direction and expand the airbag.

In the airbag according to the aspect, each of the regulating units may be configured to connect a front edge side and a rear edge side to the bag main body side in addition to the upper edge side and the lower edge side. Since each of the regulating units is connected to the front expansion portion and the rear expansion portion (occupant protection portion) in addition to the upper expansion portion and the lower expansion portion, it is preferable that the swing of the bag main body at the initial stage of expansion can be suppressed more accurately by the regulating units.

In the airbag according to the aspect, each of the regulating units may be configured as a closing panel whose peripheral edge is connected to the bag main body side over an entire circumference so as to close the hollow portion. The regulating units are arranged so that the outer peripheral edge is connected to the bag main body side over the entire length. Thus, the swing of the bag main body at the initial stage of expansion can be more accurately regulated by the regulating units.

In the airbag according to the aspect, the closing panels may be arranged at two locations so as to close both left and right end sides of the hollow portion. It is preferable that the closing panel can be easily connected to the bag main body side, which facilitates manufacturing.

In the airbag according to the aspect, in the bag main body, an exhaust hole capable of discharging the expansion gas flowing into the bag main body to the hollow portion side may be formed in an inner peripheral panel portion forming a peripheral wall of the hollow portion on an inner peripheral surface side, and in the bag main body, an area surrounded by the inner peripheral panel portion and the closing panel may be configured as a gas storage portion.

When the airbag has the configuration described above, after the expansion of the bag main body is completed, the expansion gas can be discharged into the gas storage portion to expand the gas storage portion. Therefore, when receiving a forward-moving occupant by the occupant protection portion, it is possible to secure the reaction force against the compression in the front-rear direction by the gas storage portion in a state where the internal pressure is increased. Thus, the forward-moving occupant can be more stably restrained by the occupant protection portion and the gas storage portion.

In the airbag according to the aspect, the exhaust hole may be arranged in an area forming a front surface side of the occupant protection portion in the inner peripheral panel portion. The exhaust hole is formed on the side farthest from the mounting portion, that is, the inflator which supplies expansion gas to the airbag, and thus discharge of the expansion gas during expansion of the bag main body can be suppressed. As a result, it is preferable that, after the bag main body is surely expanded, the expansion gas can be discharged into the gas storage portion from the exhaust hole.

In the airbag according to the aspect, an intake hole portion capable of taking in outside air into the gas storage portion when the bag main body is developed and expanded may be formed on at least one of the left and right closing panels. It is preferable that the outside air can be stably taken into the gas storage portion when the airbag is developed and expanded and that the gas storage portion can be surely suppressed from being in a vacuum state.

In the airbag according to the aspect, the intake hole portion may be provided with a check valve mechanism capable of suppressing gas discharge to the outside. It is preferable that, after the expansion of the bag main body is completed, the expansion gas discharged into the gas storage portion through the exhaust hole can be suppressed from being exhausted to the outside of the gas storage portion and the internal pressure of the gas storage portion can be stably maintained.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 14:
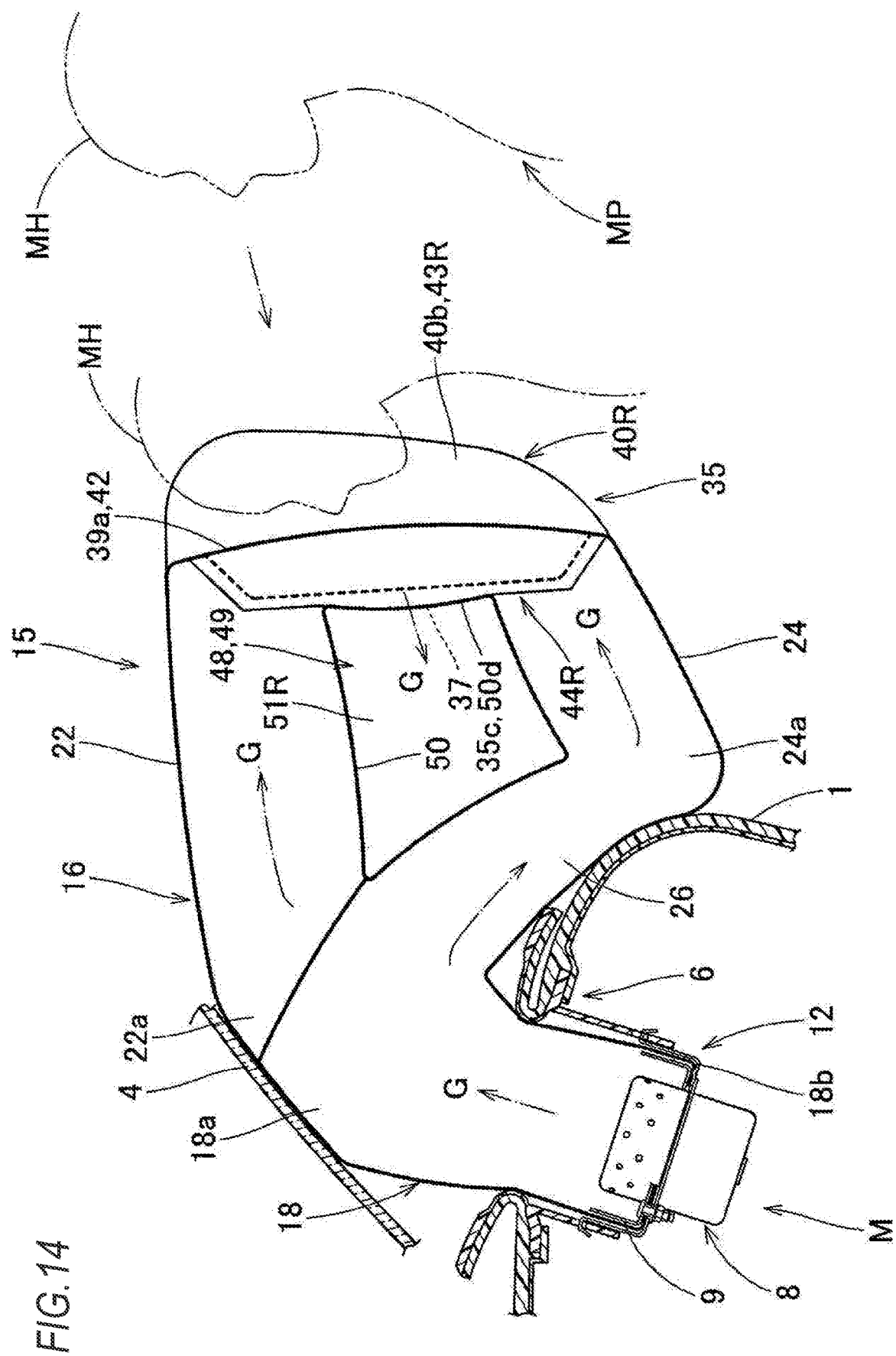
FIG. 14 is a schematic vertical cross-sectional view illustrating a state in which the airbag completes expansion in a state where the airbag of FIG. 1 is mounted on a vehicle as a passenger seat airbag device.

Hereinafter, an embodiment of the invention will be described with reference to the drawings. In the embodiment, a passenger seat airbag 15, which is folded and accommodated in front of an occupant MP seated on a passenger seat PS in a vehicle, will be taken as an example and described. As illustrated in FIG. 14, the airbag 15 is used for a top-mounted type passenger seat airbag device M arranged inside an upper surface of an instrument panel 1 in front of the occupant MP seated on the passenger seat PS. In the embodiment, the front-rear, up-down, and left-right directions coincide with the front-rear, up-down, and left-right directions of the vehicle unless otherwise specified.

Figure 15:
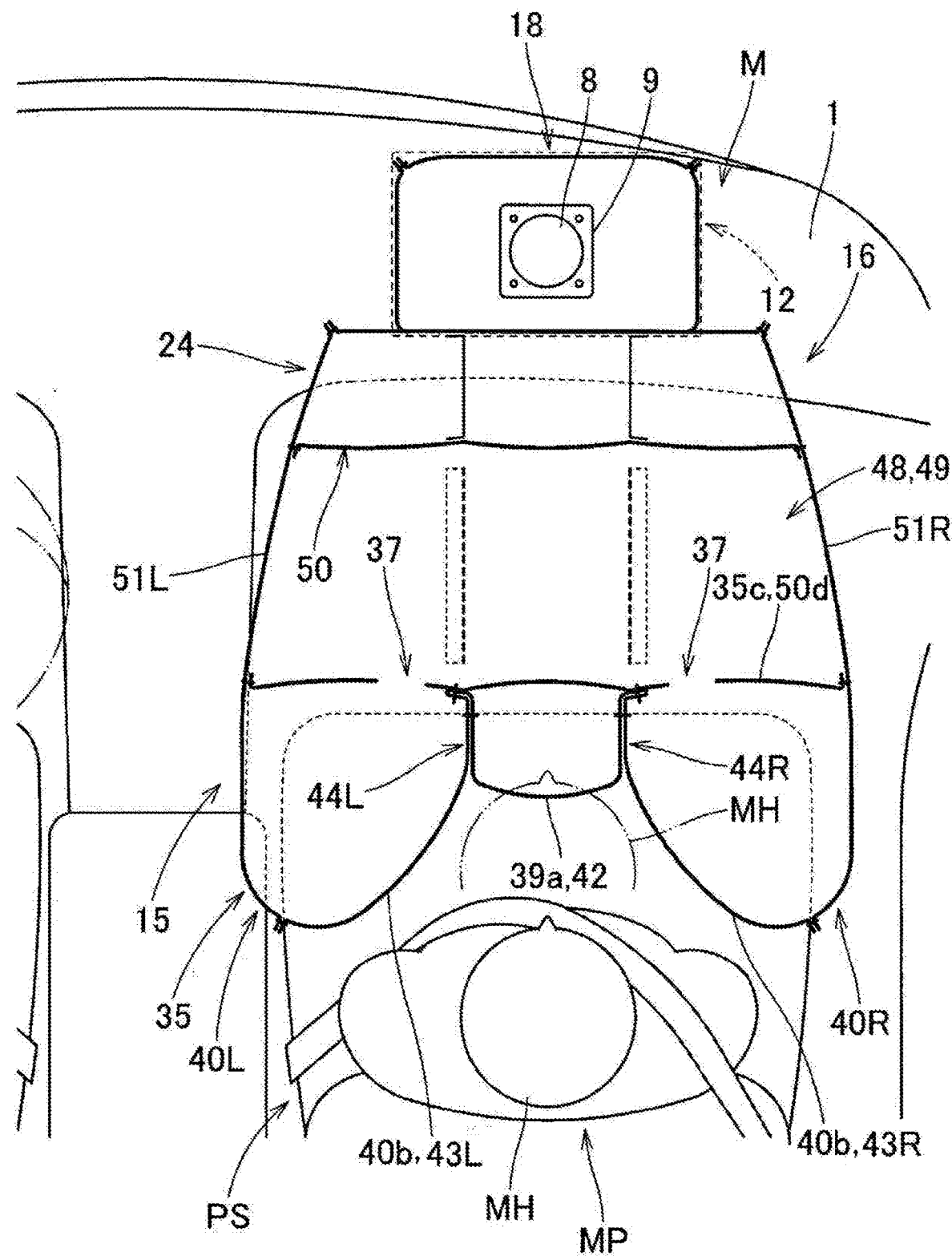
FIG. 15 is a schematic lateral cross-sectional view illustrating a state in which the airbag completes expansion in a state where the airbag of FIG. 1 is mounted on the vehicle as a passenger seat airbag device.

As illustrated in FIGS. 14 and 15, the passenger seat airbag device M of the embodiment includes the airbag 15, an inflator 8 which supplies expansion gas to the airbag 15, a case 12 as an accommodation part which accommodates and holds the airbag 15 and the inflator 8, a retainer 9 for attaching the airbag 15 and the inflator 8 to the case 12, and an airbag cover 6 which covers the folded airbag 15. Further, in the embodiment, the inflator 8 is configured to operate in the case of a front collision, an oblique collision, and an offset collision of the vehicle.

As illustrated in FIGS. 1 to 7, The airbag 15 is configured to be equipped with a bag main body 16 which expands by inflowing expansion gas inside and regulating units (in the case of the embodiment, two closing panel portions 51L and 51R) for regulating an expansion completed shape of the bag main body 16.

Figure 1:
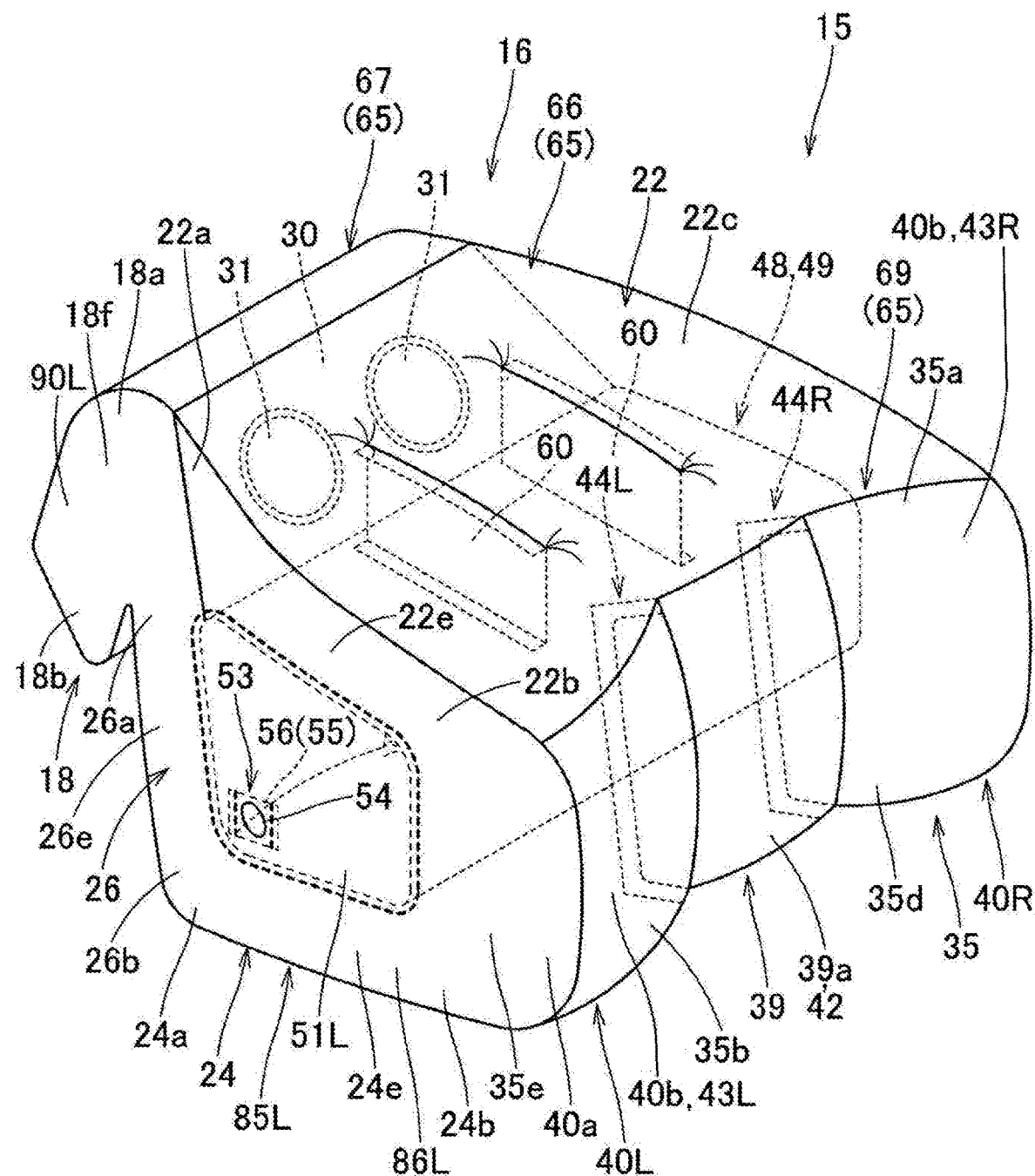
FIG. 1 is a perspective view of a passenger seat airbag according to an embodiment of the invention as viewed from diagonally rear left, illustrating a state in which the airbag is expanded by itself.
Figure 2:
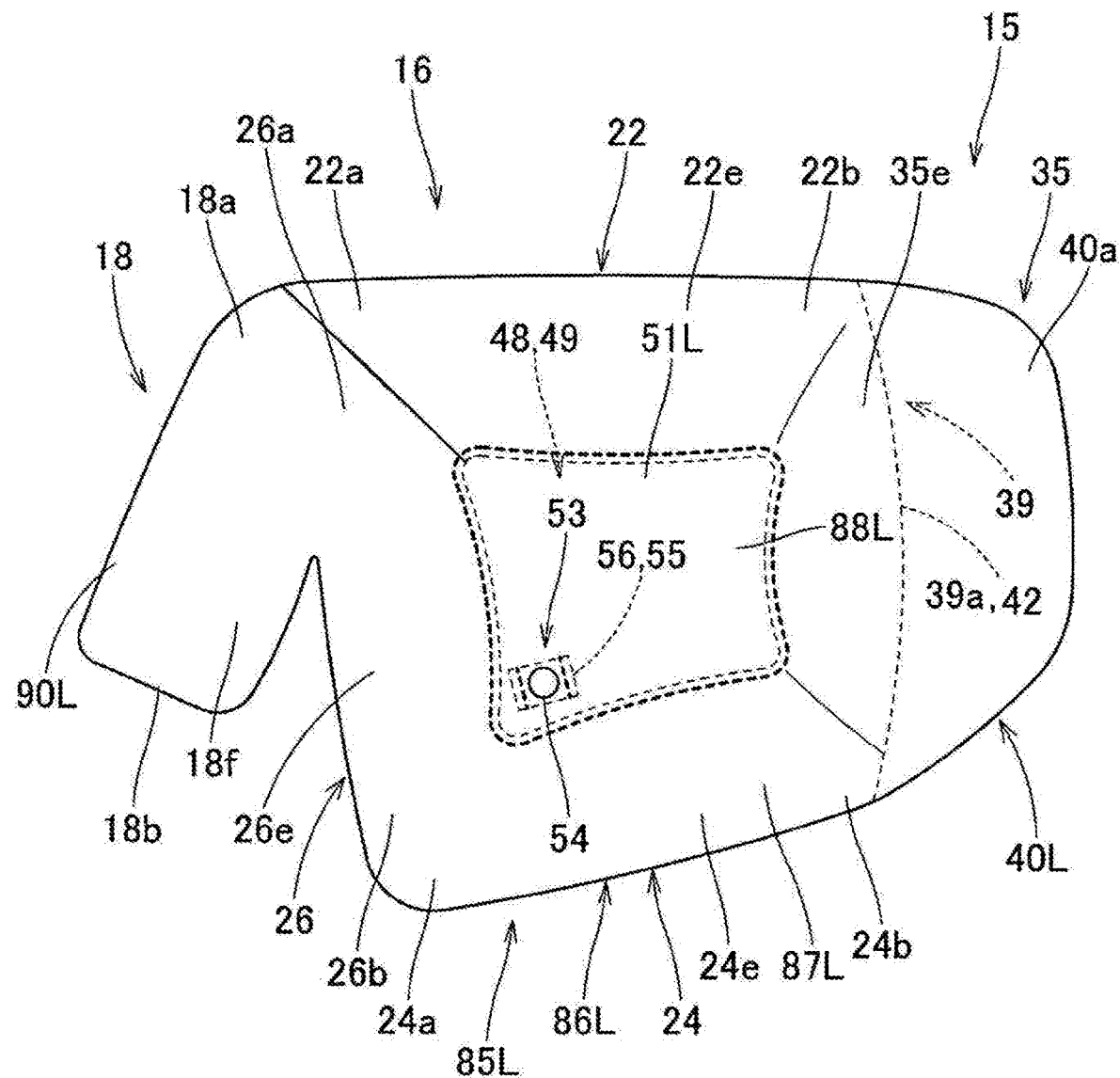
FIG. 2 is a left side view of the airbag of FIG. 1.
Figure 3:
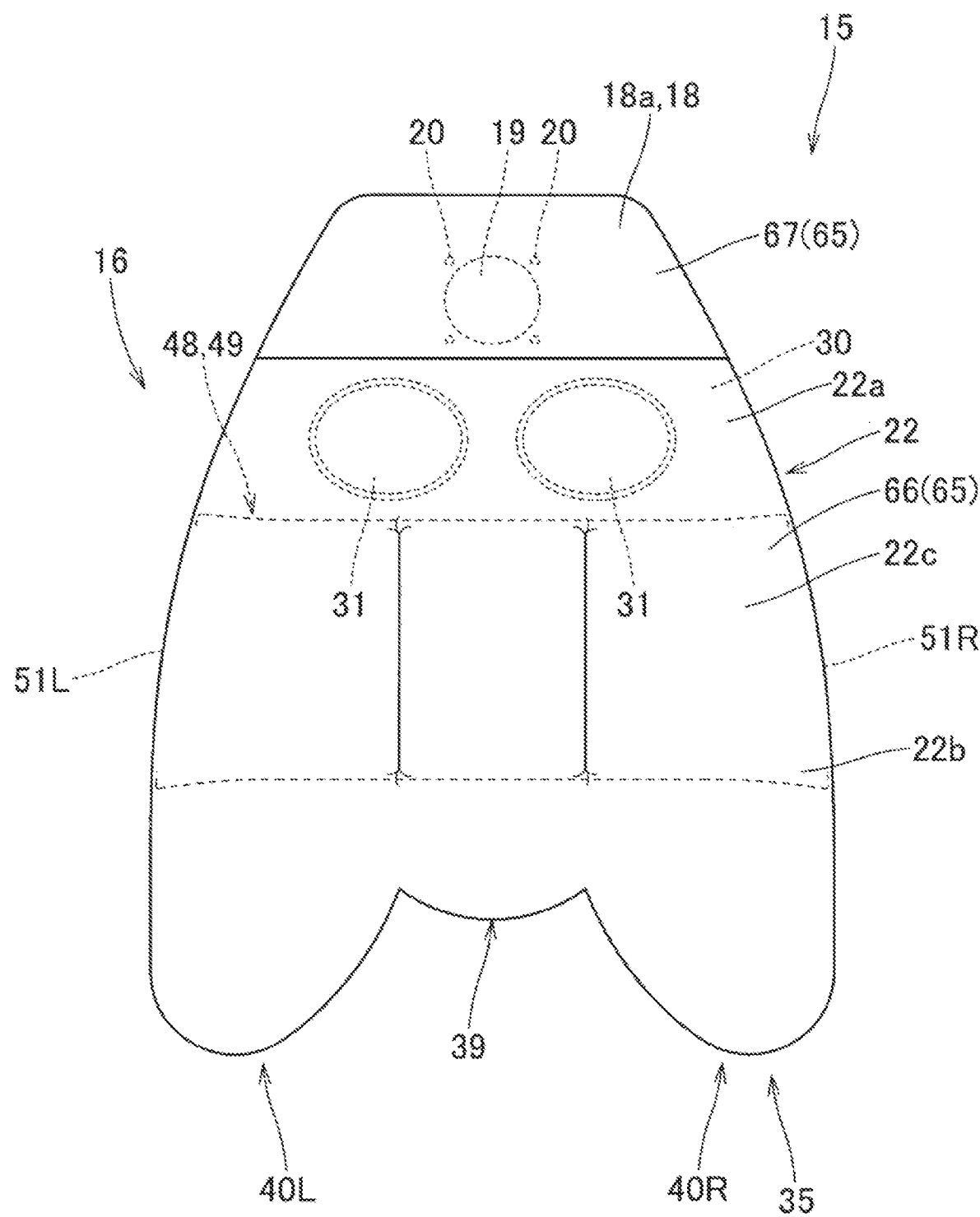
FIG. 3 is a plan view of the airbag of FIG. 1.
Figure 4:
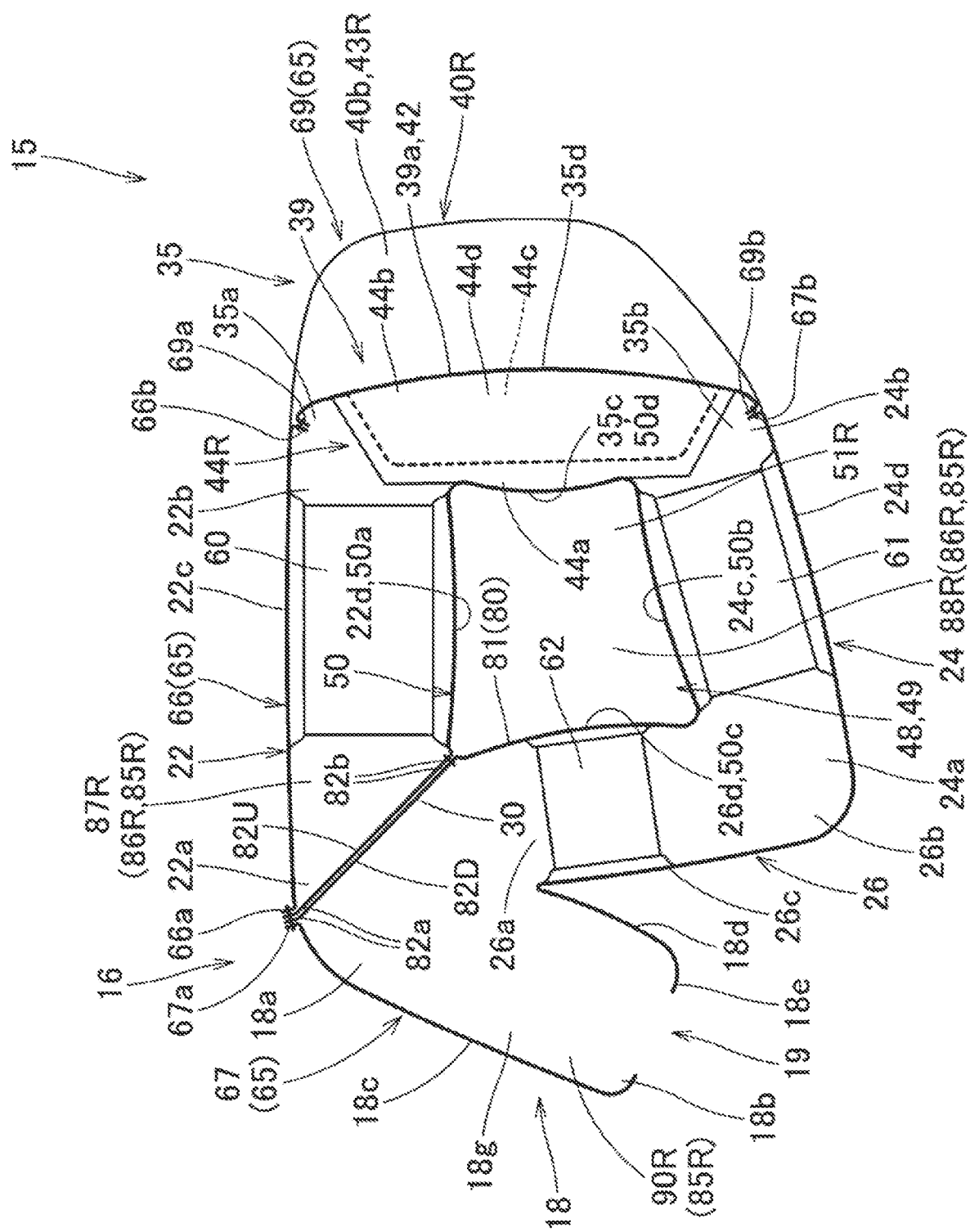
FIG. 4 is a schematic vertical cross-sectional view of the airbag of FIG. 1 along a front-rear direction on a left-right center side.

The bag main body 16 has a bag, shape made of a flexible sheet body. As illustrated in FIGS. 1, 2, and 4, the bag main body 16 has an expansion completed shape as a substantially square cylindrical shape where a hollow portion 48 which penetrates substantially along the left-right direction is provided and a circumference of the hollow portion 48 is surrounded by an upper expansion portion 22 and a lower expansion portion 24 arranged substantially along the front-rear direction on both upper and lower sides and a front expansion portion 26 and a rear expansion portion (occupant protection portion 35) arranged substantially along the up-down direction on both front and rear sides. In the embodiment, the bag main body 16 is configured such that the expansion completed shape is substantially horizontally symmetrical shape with a center of an inflow opening 19 described below as a reference (see FIGS. 3 and 5). Further, in the embodiment, the hollow portion 48 has a configuration in which a left end 48a side and a right end 48b side are closed by the closing panel portions 51L and 51R described below as regulating units (see FIGS. 5 to 7). In the airbag 15 of the embodiment, an internal region (region surrounded by a main body portion 81 of an inner peripheral panel portion 80, which will be described below, and the closing panel portions 51L and 51R (central side regions 88L and 88R in side wall panel portions 85L and 85R)) of the hollow portion 48 in which the left end 48a side and the right end 48b side are closed by the closing panel portions 51L and 51R, forms a gas storage portion 49. As illustrated in FIG. 4, the hollow portion 48 (gas storage portion 49) has a substantially square outer shape in a vertical cross section along the front-rear direction of the bag main body 16, and specifically, has a substantially trapezoidal shape which expands toward the front. In the bag main body 16, the rear expansion portion arranged on the occupant MP side when the expansion is completed forms the occupant protection portion 35 capable of protecting the occupant MP. Further, in the bag main body 16, a mounting portion 18 to be attached on the case 12 side is arranged on a front end side when the expansion is completed.

Figure 16:
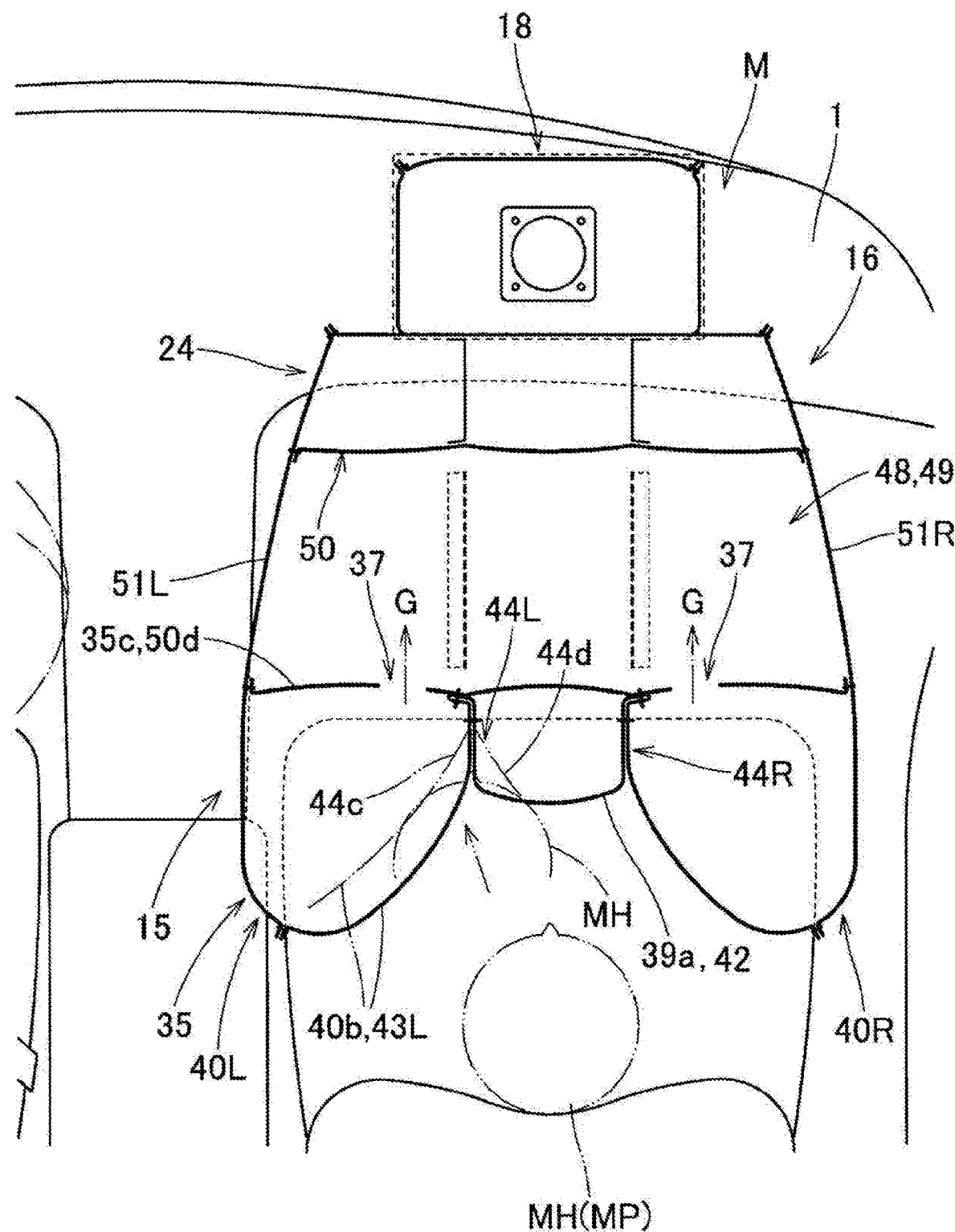
FIG. 16 is a schematic lateral cross-sectional view illustrating a state in which the airbag completes expansion in a state where the airbag of FIG. 1 is mounted on the vehicle as a passenger seat airbag device and is a schematic view of receiving a head of an occupant moving diagonally forward.

The mounting portion 18 has an expansion completed shape as a plate shape in which a longitudinal direction is substantially along the left-right direction. In the case of the embodiment, the mounting portion 18 is configured to be inclined forward downward so that an upper end 18a side is communicated with an upper end 26a side of the front expansion portion 26 and a lower end 18b side is located on a front side when viewed from the left and right sides when the expansion is completed (see FIGS. 1, 2, and 4). In the mounting portion 18, in a region of a lower wall portion 18e arranged on the lower end 18b side, the inflow opening 19 is formed in which the opening opens in a substantially circular shape so that expansion gas can flow into the inside and a peripheral edge is attached to the case 12 (see FIGS. 3 and 5). The inflow opening 19 is formed at a position substantially centered on the front, rear, left, and right of the lower wall portion 18e (see FIG. 5). A plurality (in the case of the embodiment, four pieces) of attachment holes 20 for attaching a peripheral edge of the inflow opening 19 to a bottom wall portion (reference numerals and letters are omitted in the figure) of the case 12 by inserting bolts (reference numerals and letters are omitted in the figure) of the retainer 9 are formed on the peripheral edge of the inflow opening 19. This mounting portion 18 has a configuration in which an area on the lower end 18b side is arranged in the case 12 when the expansion of the airbag 15 is completed, as illustrated in FIG. 14. In the mounting portion 18, a width dimension on the left-right directional side at the time of completion of expansion is set to be smaller than that of other parts (see FIG. 5) and width dimensions of the front, rear, left, and right are set to dimensions which can be arranged in the case 12 (see FIGS. 14 to 16). In the embodiment, the mounting portion 18 is supported by a windshield 4 on the upper end 18a side when the expansion is completed (see FIG. 14).

Figure 5:
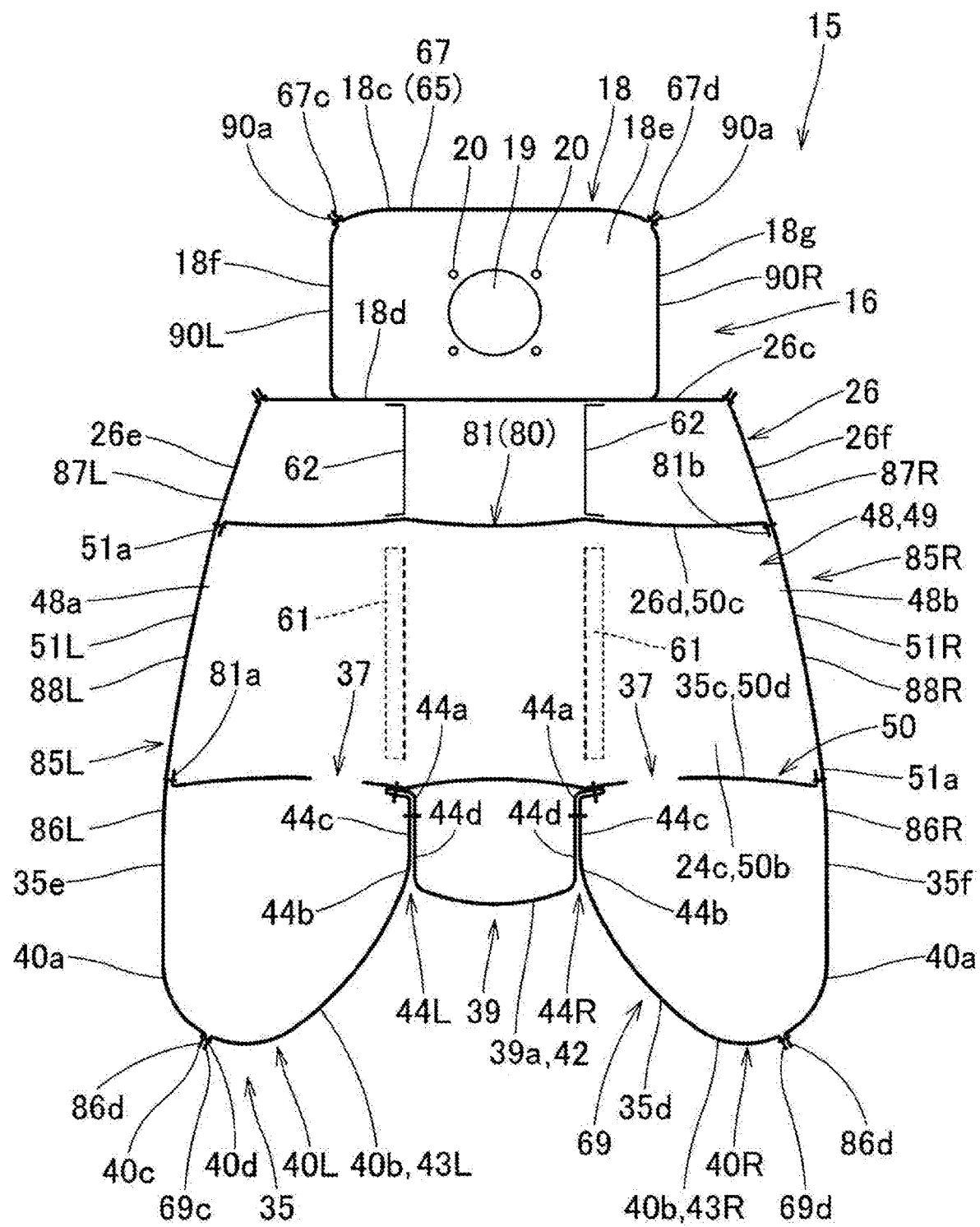
FIG. 5 is a schematic lateral cross-sectional view of the airbag of FIG. 1 along the front-rear direction.

The front expansion portion 26 has an expansion completed shape as a plate shape in which the longitudinal direction is substantially along the left-right direction. In the front expansion portion 26, the upper end 26a side is communicated with the upper end 18a of the mounting portion 18 and a front end 22a of the upper expansion portion 22 and a lower end 26b side is communicated with a front end 24a of the lower expansion portion 24. The front expansion portion 26 is configured to be arranged so as to be substantially along the up-down direction when viewed from the left and right sides when the expansion is completed (see FIG. 2). Specifically, in the case of the embodiment, the front expansion portion 26 is configured such that the expansion completed shape is narrowed on the upper end 26a side communicating with the mounting portion 18 and the upper expansion portion 22 and is widened to the left and right toward the lower end 26b side communicating with the lower expansion portion 24. The front expansion portion 26 is supported by the instrument panel 1 on a lower front surface side (lower end side of a front wall portion 26c) when the expansion is completed (see FIG. 14). Further, as illustrated in FIGS. 4 and 5, a rear wall portion 26d in the front expansion portion 26 forms the peripheral wall (a front wall portion 50c in a peripheral wall 50 in the gas storage portion 49) in the hollow portion 48.

Figure 6:
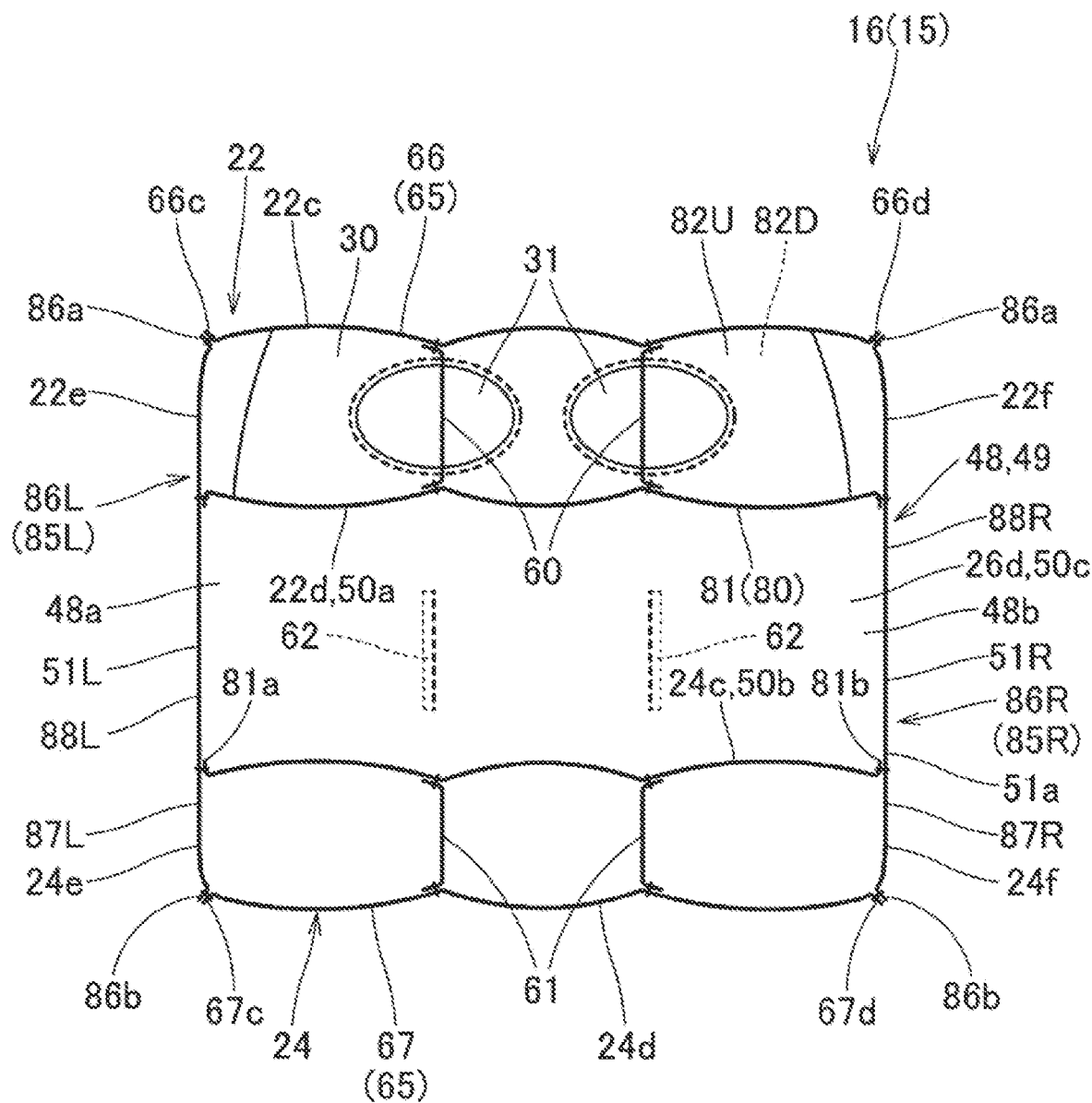
FIG. 6 is a schematic vertical cross-sectional view of the airbag of FIG. 1 along a left-right direction on a front-rear center side and is a view of a mounting portion side.
Figure 7:
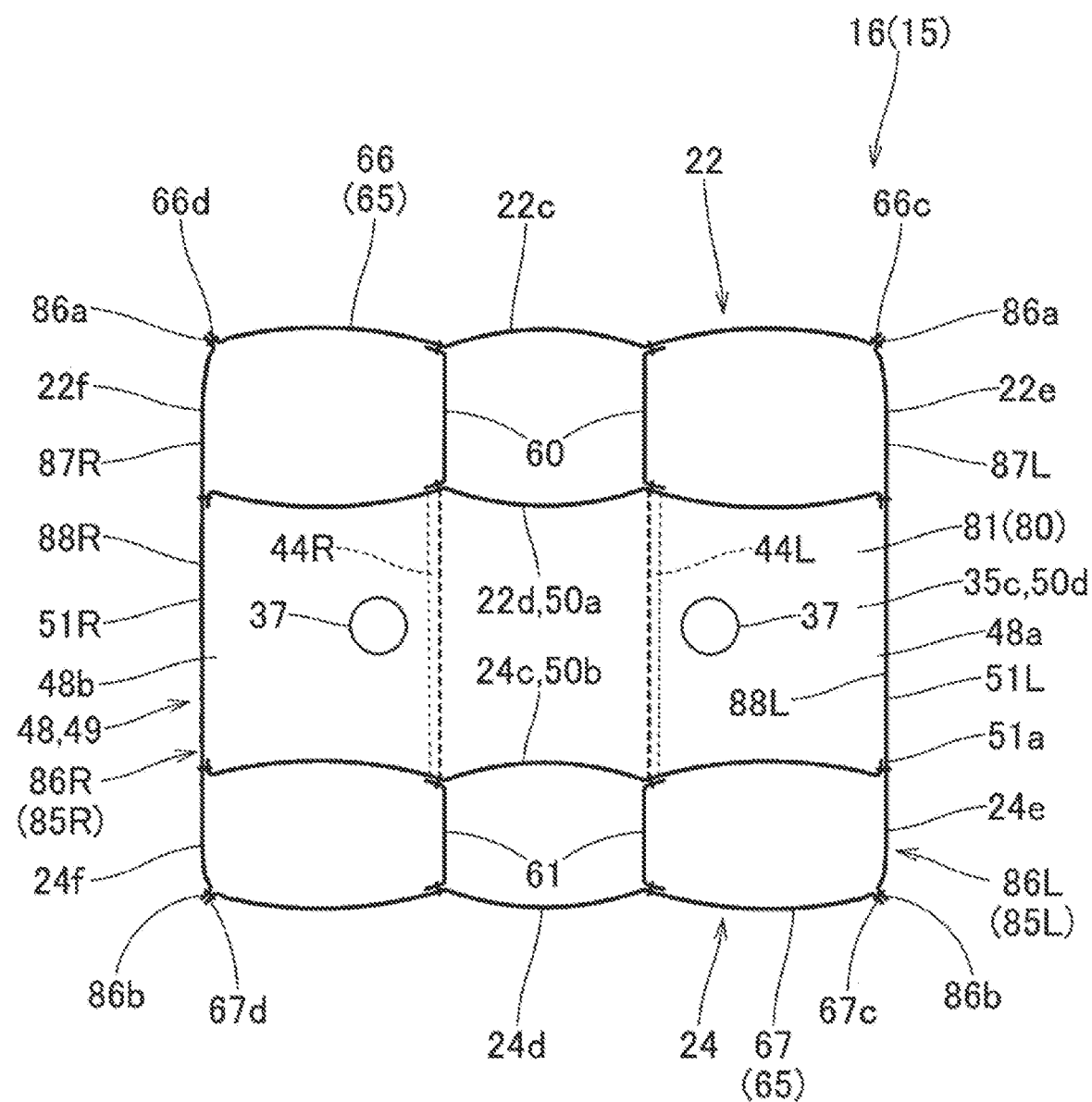
FIG. 7 is a schematic vertical cross-sectional view of the airbag of FIG. 1 along the left-right direction on the front-rear center side and is a view of an occupant protection portion side.

The upper expansion portion 22 has an expansion completed shape as a substantially plate shape in which the longitudinal direction is substantially along the left-right direction. In the upper expansion portion 22, the front end 22a side is communicated with the upper end 26a of the front expansion portion 26 and the upper end 18a of the mounting portion 18 and a rear end 22b side is communicated with an upper end 35a of the occupant protection portion 35 as the rear expansion portion. The upper expansion portion 22 is configured to be arranged so as to be substantially orthogonal to the front expansion portion 26 and be substantially along the front-rear direction when viewed from the left and right sides when the expansion is completed (see FIG. 2). Further, as illustrated in FIG. 3, in detail, the upper expansion portion 22 is configured such that a part on the front end 22a side communicating with the mounting portion 18 and the front expansion portion 26 has a narrow width and a part on the rear end 22b side communicating with the occupant protection portion 35 has a wide width. The upper expansion portion 22 has a configuration in which the front end 22a side, specifically, a front upper surface side (a front end side of an upper wall portion 22c) is supported by the windshield 4 when the expansion is completed (see FIG. 14). As illustrated in FIGS. 4, 6 and 7, a lower wall portion 22d in the upper expansion portion 22 forms the peripheral wall (an upper wall portion 50a in the peripheral wall 50 in the gas storage portion 49) in the hollow portion 48.

Further, in the embodiment, the front end 22a side of the upper expansion portion 22 and the upper end 26a side of the front expansion portion 26 are partitioned by a partition wall portion 30. The peripheral edges of the partition wall portion 30 are joined to a wall portion forming a boundary part between the upper expansion portion 22 and the front expansion portion 26 over the entire circumference (see FIGS. 1 and 4). Two circularly open communication holes 31 and 31 are arranged side by side in the partition wall portion 30 on the left-right directional side (see FIGS. 1, 3, and 6) and the communication holes 31 allow the upper expansion portion 22 and the front expansion portion 26 to be communicated with each other. The partition wall portion 30 and the communication hole 31 are arranged so that the expansion gas flowing in through the mounting portion 18 can be stably flowed out to the front expansion portion 26 side (lower expansion portion 24 side) by suppressing an excessive outflow to the upper expansion portion 22 side.

The lower expansion portion 24 has an expansion completed shape as a substantially plate shape in which the longitudinal direction is substantially along the left-right direction. In the lower expansion portion 24, it is configured such that the front end 24a side is communicated with the lower end 26b of the front expansion portion 26 and a rear end 24b side is communicated with a lower end 35b of the occupant protection portion 35. The lower expansion portion 24 is configured to be arranged substantially along the front-rear direction so as to be substantially orthogonal to the front expansion portion 26 and be substantially along the upper expansion portion 22 when viewed from the left and right sides when the expansion is completed (see FIG. 2). Further, the lower expansion portion 24 has a substantially rectangular plate shape in which the expansion completed shape has substantially the same width dimension over the entire front and rear area. In addition, specifically, the lower expansion portion 24 is formed so as to be slightly inclined with respect to the upper expansion portion 22 so that the rear end 24b side is slightly closer to the upper expansion portion 22 side. The lower expansion portion 24 has a configuration in which a front surface lower side (in detail, on the front end 24a side, near an intersection part with the front expansion portion 26) at the time of completion of expansion is supported by being in contact with the instrument panel 1 (see FIG. 14). As illustrated in FIGS. 4, 6, and 7, an upper wall portion 24c in the lower expansion portion 24 forms the peripheral wall (a lower wall portion 50b in the peripheral wall 50 in the gas storage portion 49) in the hollow portion 48.

The occupant protection portion 35 as the rear expansion portion has a substantially plate shape which is substantially along the up-down direction so that the shape at the time of completion of expansion is substantially orthogonal to the upper expansion portion 22 and the lower expansion portion 24 on the occupant MP side, which is a rear end side at the time of completion of expansion. In the occupant protection portion 35, the upper end 35a side is communicated with the rear end 22b of the upper expansion portion 22 and the lower end 35 side is communicated with the rear end 24b of the lower expansion portion 24. The occupant protection portion 35 has a substantially rectangular shape having substantially the same width dimension over substantially the entire vertical area. In the occupant protection portion 35, a front wall portion 35c forms the peripheral wall (a rear wall portion 50d in the peripheral wall 50 in the gas storage portion 49) in the hollow portion 48 (see FIGS. 4, 5, and 7). In the case of the embodiment, an exhaust hole 37 capable of discharging the expansion gas G flowing into the bag main body 16 to the hollow portion 48 (gas storage portion 49) side is formed in the front wall portion 35c (an area which is the rear wall portion 50d of the gas storage portion 49 and forms a front surface side of the occupant protection portion 35 in the main body portion 81 of the inner peripheral panel portion 80 described below) of the occupant protection portion 35 (see FIGS. 5 and 7). In the case of the embodiment, the exhaust holes 37 are formed at two locations along the left-right direction at substantially a vertical center of the front wall portion 35c. Specifically, the exhaust hole 37 has an opening area set to a size which suppresses the discharge of expansion gas during development and expansion of the bag main body 16 and allows the expansion gas to be discharged into the gas storage portion 49 after the expansion of the bag main body 16 is completed. Further, the number of exhaust holes 37 arranged is not limited to the embodiment, and may be provided at only one location.

Further, in the case of the embodiment, as illustrated in FIGS. 1 and 3 to 5, the occupant protection portion 35 includes the central side region 39 and protruding regions 40L and 40R which are arranged on both the left and right sides of the central side region 39 and protrude rearward and outward with respect to the central side region 39. The central side region 39 is composed of a region covering substantially the entire vertical area of a left-right central side part of the occupant protection portion 35 and the protruding regions 40L and 40R are formed on both the left and right sides of the central side region 39, respectively, over substantially the entire vertical area of the occupant protection portion 35 (see FIG. 4). In the case of the embodiment, peripheral edges 40c and 40d of an outer wall portion 40a formed continuously from a left wall portion 35e or a right wall portion 35f in the occupant protection portion 35 and an inner wall portion 40b arranged on the central side region 39 side are joined to each other, in such a manner that the protruding regions 40L and 40R are formed (see FIG. 5).

Then, in the embodiment, a rear wall portion 39a (a part on the central side in the left-right direction in a rear wall portion 35d of the occupant protection portion 35) of the central side region 39 in the occupant protection portion 35 forms a front collision restraint surface 42 which can receive and protect a head MH of the occupant MP which moves forward in the event of the front collision of the vehicle and the inner wall portions 40b in the protruding regions 40L and 40R form oblique collision restraint surfaces 43L and 43R which receive and protect the head MH of the occupant MP which moves diagonally forward in the event of a diagonal collision or offset collision of the vehicle. The oblique collision restraint surfaces 43L and 43R (inner wall portions 40b) are formed so as to be inclined with respect to the front-rear direction so that the rear end sides are located outward on the left and right when the airbag 15 at the time of completion of expansion is viewed from the up-down directional side (see FIGS. 3 and 5).

Figure 8:
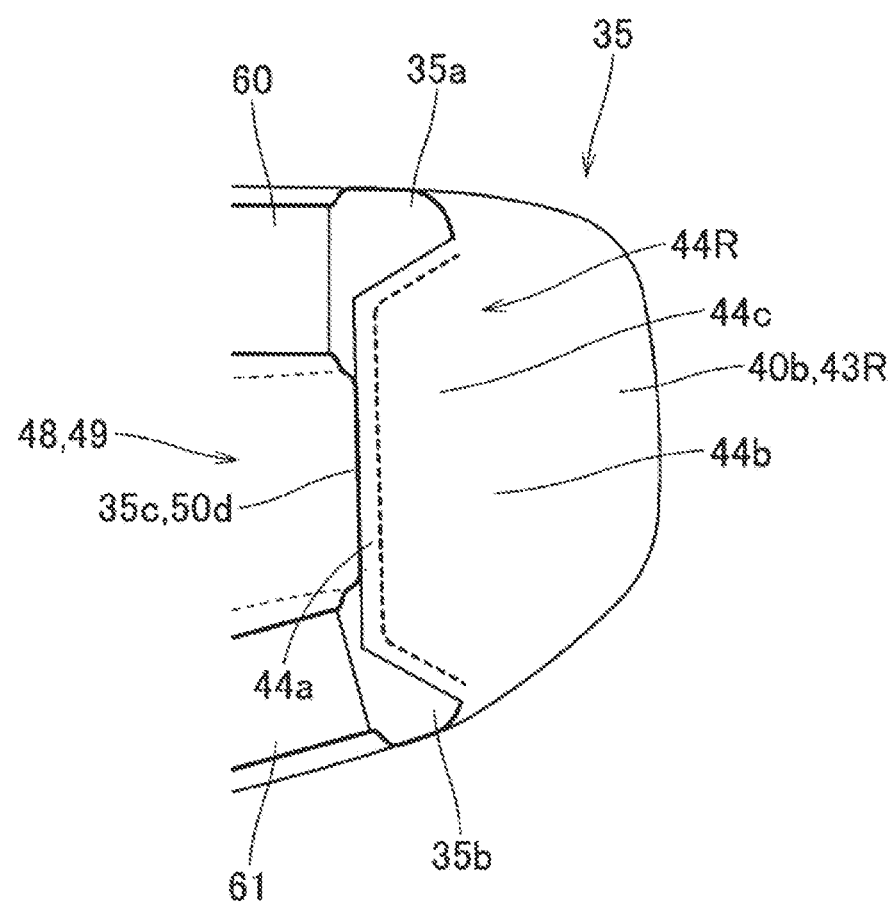
FIG. 8 is a schematic partial vertical cross-sectional view illustrating a part of a restraint recess portion in the airbag of FIG. 1.
Figure 9:
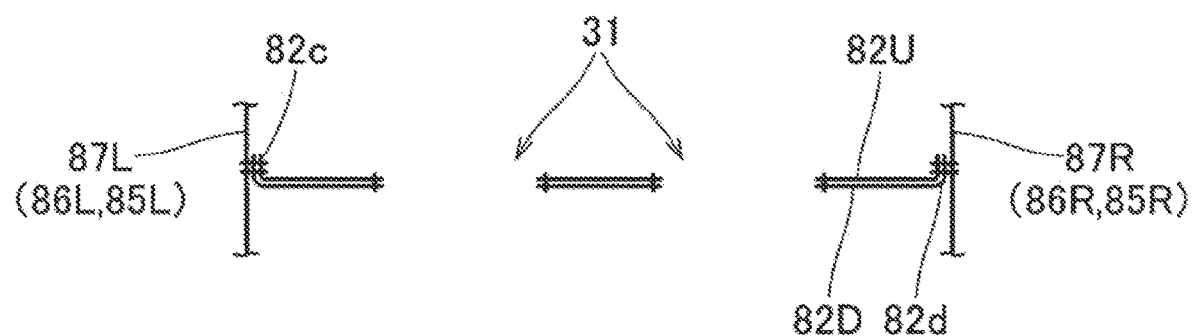
FIG. 9 is a schematic cross-sectional view illustrating a part of a partition wall portion in the airbag of FIG. 1.

Further, on the rear surface side of the occupant protection portion 35, at boundary parts (boundary parts between the front collision restraint surface 42 and the oblique collision restraint surfaces 43L and 43R) between the central side region 39 and the protruding regions 40L and 40R, restraint recess portions 44L and 44R for allowing the head MH of the occupant MP to enter and restraining the head MH are respectively formed (see FIG. 5). The restraint recess portions 44L and 44R substantially follow the up-down direction and are formed over substantially the entire vertical area of the occupant protection portion 35 as illustrated in FIG. 4. Specifically, as illustrated in FIG. 5, the restraint recess portions 44L and 44R are configured to be recessed forward in a pocket shape by opening rear end 44b sides. By joining (sewing) upper edges, lower edges, and front edges of substantially rectangular outer wall 44c and inner wall 44d, which are wide in the up-down direction when viewed from the left-right directional side, the restraint recess portions 44L and 44R are configured in a substantially pocket shape with the rear end 44b sides opened (see FIG. 8). In the restraint recess portions 44L and 44R, tips (front ends 44a) of the recesses are sewn (connected) to the front wall portion 35c (the main body portion 81 described below in the inner peripheral panel portion 80) of the occupant protection portion 35 forming the peripheral wall 50 (rear wall portion 50d) of the hollow portion 48 (gas storage portion 49) by using suture (see FIG. 5). Then, when the expansion of the airbag 15 is completed, the restraint recess portions 44L and 44R are arranged substantially along the front-rear direction in a state where opening of an opening portion on the rear end 44b side is suppressed so that the outer wall 44c and the inner wall 44d are in contact with each other over substantially the entire area (see FIG. 5). The restraint recess portions 44L and 44R are for allowing the head MH of the occupant MP moving diagonally forward to enter and protecting the head MH. In the restraint recess portions 44L and 44R, a width dimension (depth) on the front-rear directional side is set to be substantially the same as a thickness at the time of completion of expansion of the central side region 39 in the occupant protection portion 35 (see FIGS. 5 and 8) and an area in front of the head MH of the occupant MP is set to a size which allows the head MH to enter.

In the airbag 15 of the embodiment, as illustrated in FIGS. 1 and 4 to 7, the upper expansion portion 22, the lower expansion portion 24, and the front expansion portion 26 have a substantially plate-like expansion completed shape by arranging tethers 60, 61, and 62 for thickness regulation inside. In the front expansion portion 26, the tether 62 is arranged in a strip shape substantially along the up-down direction so as to connect the front wall portion 26c and a rear wall portion 26d in a region on the upper end 26a side branching from the mounting portion 18. In the upper expansion portion 22, the tether 60 is arranged in a strip shape substantially along the front-rear direction so as to connect the upper wall portion 22c and the lower wall portion 22d at an intermediate part in the front-rear direction. In the lower expansion portion 24, the tether 61 is arranged in a strip shape substantially along the front-rear direction so as to connect an upper wall portion 24c and a lower wall portion 24d at an intermediate part in the front-rear direction. Specifically, the tethers 60 and 61 located in the upper expansion portion 22 and the lower expansion portion 24 are set to have a longer length dimension than that of the tether 62 located in the front expansion portion 26 so that it is possible to regulate the thickness dimension widely in the front and back (see FIG. 4). The tethers 60, 61, and 62 are arranged side by side at two locations on the left-right directional side. A tether is not arranged in the area of occupant protection portion 35. However, as illustrated in FIG. 5, the restraint recess portion 44L and 44R extending from the rear wall portion 35d and connecting the tips (front ends 44a) of the recesses to the front wall portion 35c also serves the same role as the tethers 60, 61, and 62, and thus a separation distance between the front wall portion 35c and the rear wall portion 35d is regulated and the expansion completed shape of the occupant protection portion 35 is made into a plate shape.

In the embodiment, regulating units for regulating the expansion completed shape of the bag main body 16 are two closing panel portions 51L and 51R (closing panels) which close the hollow portion 48 as described above. The closing panel portions 51L and 51R (closing panels) are arranged at two locations so as to connect the peripheral edges 51a to the bag main body 16 side over the entire circumference and to close the left end 48a side and the right end 48b side of the hollow portion 48 (see FIGS. 5 to 7). As described above, the bag main body 16 is configured as a substantially horizontally symmetrical shape with the center of the inflow opening 19 arranged at the substantially center of the mounting portion 18 in the left-right direction as a reference. That is, the closing panel portions 51L and 51R are arranged on the left end 48a side and the right end 48b side of the hollow portion 48 are arranged at two locations horizontally symmetrical centered on the center of the bag main body 16 on the left-right directional side. Specifically, in the case of the embodiment, the closing panel portions 51L and 51R are respectively composed of the central side regions 88L and 88R of side wall constituent portions 86L and 86R in the side wall panel portions 85L and 85R, which will be described below. That is, in the embodiment, the closing panel portion 51L arranged on the left end side is connected to left wall portions 22e, 24e, 26e, and 35e of the upper expansion portion 22, the lower expansion portion 24, the front expansion portion 26, and the occupant protection portion 35 and is integrally formed with these left wall portions 22e, 24e, 26e, and 35e. Similarly, the closing panel portion 51R arranged on the right end side is integrally configured with right wall portions 22f, 24f, 25f, and 35f of the upper expansion portion 22, the lower expansion portion 24, the front expansion portion 26, and the occupant protection portion 35 (see FIGS. 5 to 7). Then, as described above, the area surrounded by these closing panel portions 51L and 51R and the main body portion 81 of the inner peripheral panel portion 80 forming the peripheral wall 50 of the hollow portion 48 forms the gas storage portion 49 capable of storing, the expansion gas G discharged from the exhaust hole 37 formed on a front surface side of the occupant protection portion 35.

Figure 10:
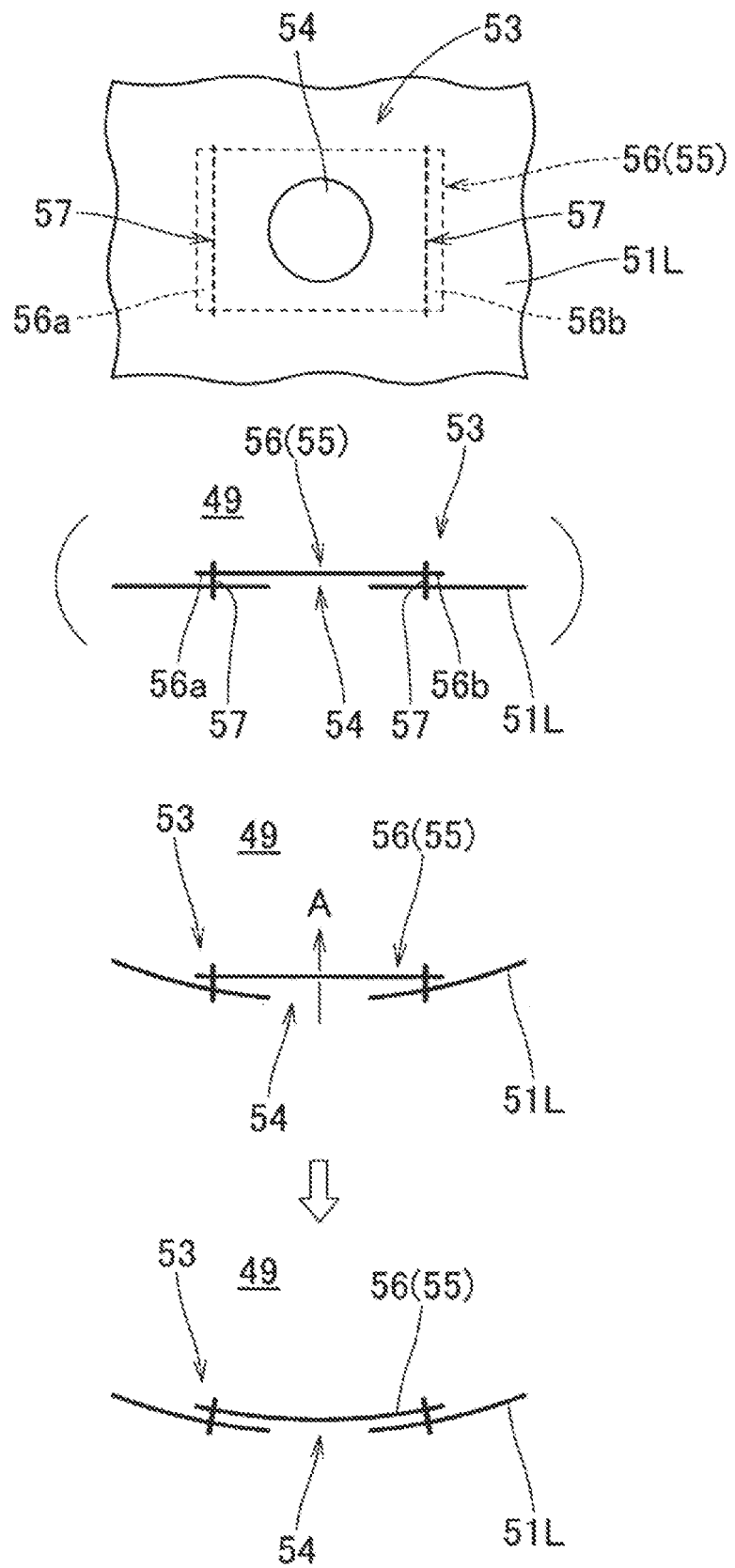
FIG. 10 is a schematic view illustrating an intake hole portion formed in the airbag of FIG. 1.

Further, in the airbag 15 of the embodiment, as illustrated in FIGS. 1 and 2, an intake hole portion 53 is formed in the closing panel portion 51L arranged on a left end side. The intake hole portion 53 is for taking in outside air into the gas storage portion 49 when the bag main body 16 is developed and expanded. The intake hole portion 53 includes a hole main body 54 opened in a substantially circular shape and a check valve mechanism 55 capable of closing the hole main body 54. The hole main body 54 has an opening area set to be smaller than an opening area of the exhaust hole 37. In the case of the embodiment, an inner diameter dimension of the hole body 54 is set to be smaller than an inner diameter dimension of the exhaust hole 37 (see FIGS. 11 and 12), As illustrated in FIG. 10, the check valve mechanism 55 is composed of a flap material 56 which is set to a size capable of closing the hole main body 54 inside the closing panel portion 51L and in which two opposing edge portions 56a and 56b are joined to the closing panel portion 51L at a periphery edge of the hole main body 54. Specifically, the flap material 56 has a substantially rectangular shape which is set to a size that allows the hole body 54 to be closed and has a configuration in which two opposing edge portions 56a and 56b (in the case of the embodiment, the two edge portions on a longitudinal directional side and the front-rear directional side) are joined to the closing panel portion 51L over a substantially overall length. That is, a length dimension of a joining part 57 which joins the edge portions 56a and 56b of the flap material 56 to the closing panel portion 51L is set to be larger than an inner diameter dimension of the hole main body 54. In the intake hole portion 53, when the bag main body 16 expands so as to eliminate folding of the closing panel portion 51L (side wall panel portion 85L), a gap is generated between the closing panel portion 51L and the flap material 56 and the hole main body 54 is opened so that outside air can be taken in. As a result, outside air A is taken in from the hole main body 54 (see part A in FIG. 10). Then, when the expansion of the bag main body 16 is completed, the flap material 56 is pressed against the peripheral edge of the hole body 54 by the internal pressure of the expansion gas discharged into the gas storage portion 49 and the outside air taken in, and thus the hole main body 54 is closed and the discharge of gas from the hole main body 54 to the outside is suppressed (see part B in FIG. 10). In the case of the embodiment, the intake hole portion 53 is formed at a position near a front lower end in the closing panel portion 51L, as illustrated in FIGS. 1 and 2.

The airbag 15 has a bag shape by connecting corresponding edge portions of a plurality of predeterminedly shaped base materials made of a flexible sheet body to each other. Specifically, as illustrated in FIGS. 11 and 12, the base material forming the airbag 15 includes an outer peripheral panel portion 65, the inner peripheral panel portion 80, and the side wall panel portions 85L and 85R.

The outer peripheral panel portion 65 is arranged on an outer peripheral surface side of the airbag 15 when the expansion is completed and includes an occupant side panel 69, an upper panel 66, and a lower panel 67.

Figure 11:
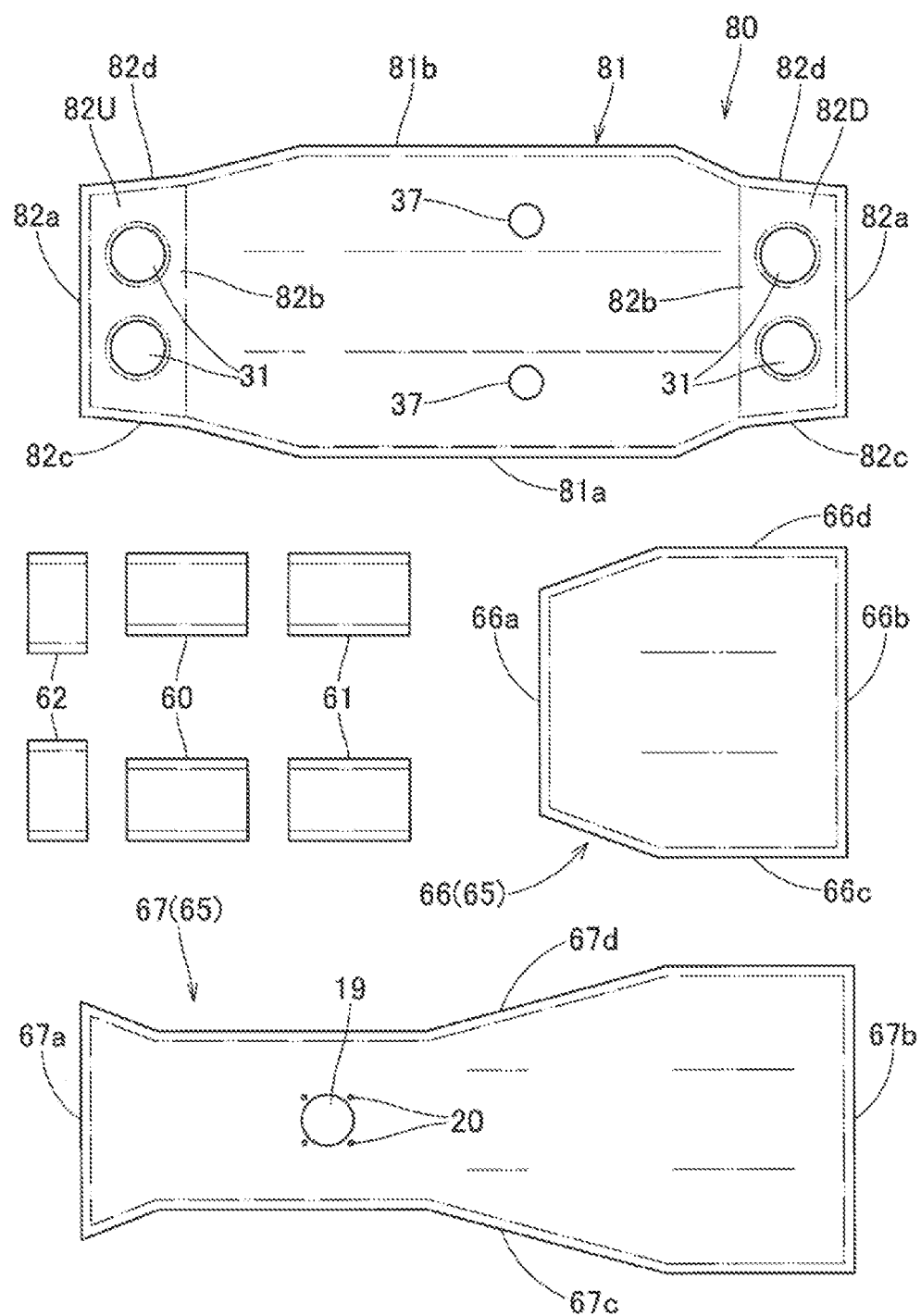
FIG. 11 is a plan view illustrating a base fabric forming the airbag of FIG. 1.
Figure 12:
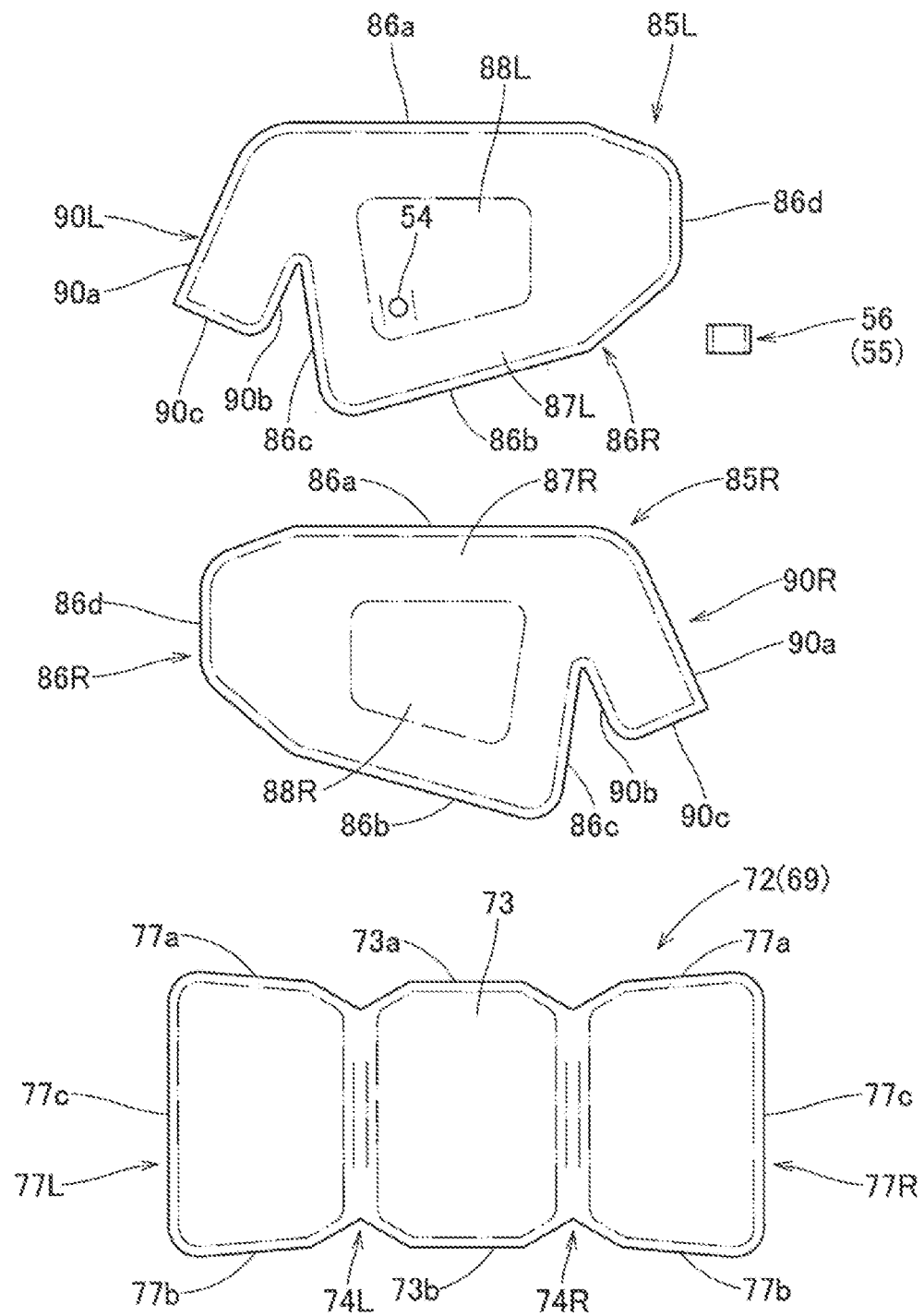
FIG. 12 is a plan view illustrating a remaining base fabric forming the airbag of FIG. 1.

The upper panel 66 forms the upper wall portion 22c of the upper expansion portion 22, and as illustrated in FIG. 11, an outer shape is a substantially rectangular shape with a front end side part slightly narrowed. The lower panel 67 forms a front wall portion 18c, the lower wall portion 18e, and a rear wall portion 18d in the mounting portion 18 and the lower wall portion 24d of the lower expansion portion 24 and, as illustrated in FIG. 11, the lower panel 67 has a substantially strip shape with an area forming the mounting portion 18 narrowed. Both the upper panel 66 and the lower panel 67 are horizontally symmetrical.

The occupant side panel 69 forms the rear wall portion 35d arranged on the occupant MP side in the occupant protection portion 35. Specifically, the occupant side panel 69 forms from the inner wall portions 40b (oblique collision restraint surfaces 43L and 43R) in respective protruding regions 40L and 40R, through respective restraint recess portions 44L and 44R, to the rear wall portion 39a (front collision restraint surface 42) in the central side region 39.

Figure 13A:
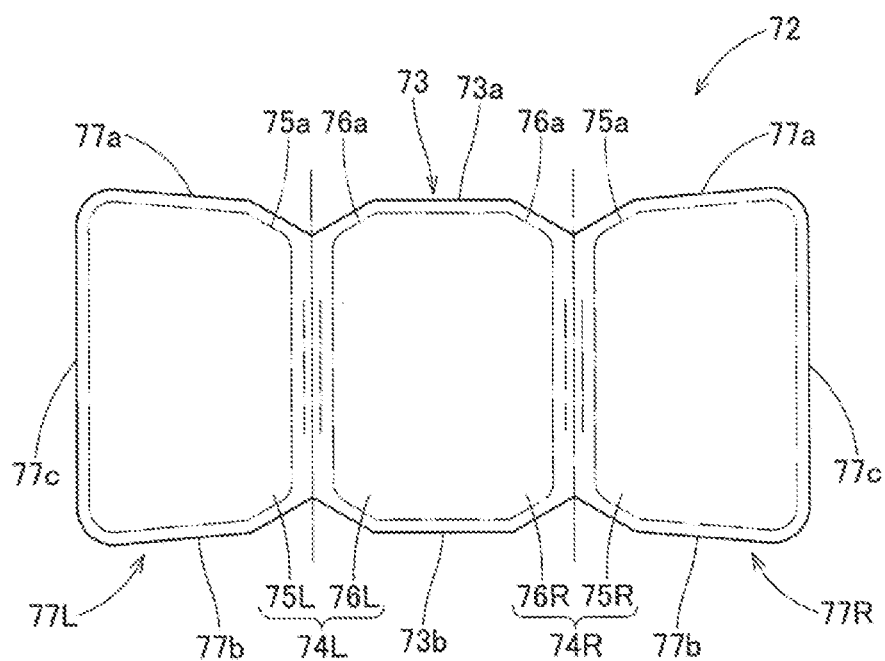
FIGS. 13A and 13B are plan views illustrating an occupant-side panel base material and an occupant-side panel in the base fabric forming the airbag of FIG. 1.
Figure 13B:
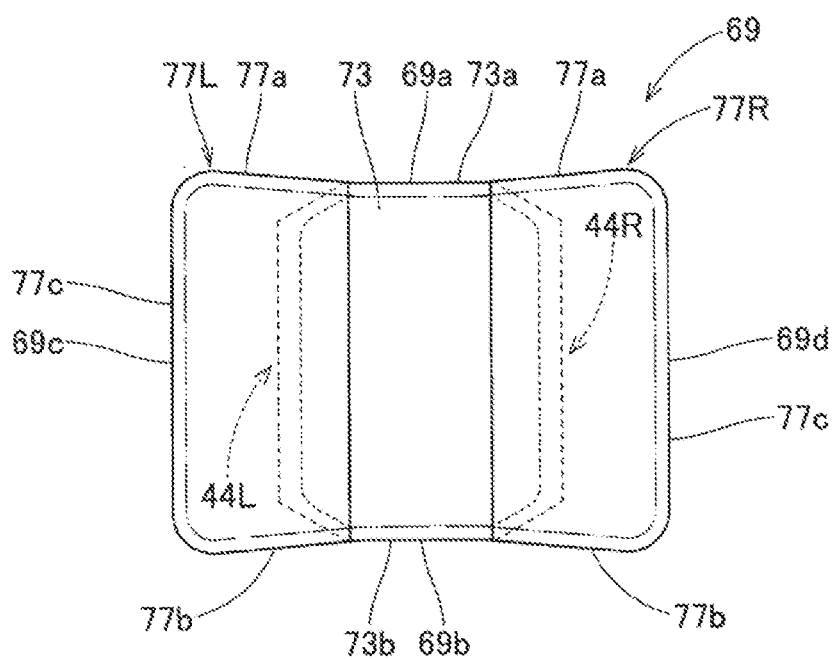

Specifically, the occupant side panel 69 is composed of an occupant side panel base material 72 illustrated in FIGS. 12 and 13A. The occupant side panel base material 72 is configured as a substantially strip shape in which protruding region constituent portions 77L and 77R forming the inner wall portions 40b of respective protruding regions 40L and 40R, recess portion constituent portions 74L and 74R forming respective restraint recess portions 44L and 44R, and a central side region constituent portion 73 forming the rear wall portion 39a of the central side region 39 are arranged side by side. The recess portion constituent portions 74L and 74R respectively have outer wall constituent portions 75L and 75R and inner wall constituent portions 76L and 76R, forming the outer walls 44c and inner walls 44d of the restraint recess portions 44L and 44R. The recess portion constituent portions 74L and 74R have an outer shape such that the outer wall constituent portions 75L and 75R and inner wall constituent portions 76L and 76R are connected to the central side region constituent portion 73 or the protruding region constituent portions 77L and 77R on the rear end sides and connected on the front end sides. Then, the recess portion constituent portions 74L and 74R are folded in half so that the outer wall constituent portions 75L and 75R and the inner wall constituent portions 76L and 76R overlap each other and peripheral edges 75a and 76a are connected to each other, in such a manner that the restraint recess portions 44L and 44R can be formed (see FIGS. 13A and 13B). Then, as illustrated in FIG. 13B, the occupant side panel 69 is composed of a state in which the restraint recess portions 44L and 44R are formed on the occupant side panel base material 72. Both the occupant side panel base material 72 and the occupant side panel 69 are horizontally symmetrical.

In occupant side panel 69, the central side region constituent portion 73 has a substantially rectangular shape wide on the up-down directional side and the protruding region constituent portions 77L, 77R arranged adjacent to the central side region constituent portion 73 via the restraint recess portions 44L and 44R have a substantially trapezoidal shape which is slightly expanded vertically toward an outer edge 77c side away from the central side region constituent portion 73. That is, the central side region constituent portion 73 is set so that a width dimension on the up-down directional side is set to be smaller than a width dimension on the up-down directional side on the outer edge 77c side in the protruding region constituent portions 77L and 77R. The protruding region constituent portions 77L and 77R are configured by inclining upper edges 77a and lower edges 77b so as to approach each other toward the central side region constituent portion 73. In the case of the embodiment, the occupant side panel 69 is also symmetrical on the up-down directional side.

The inner peripheral panel portion 80 is arranged on an inner peripheral surface side of the airbag 15 when the expansion is completed and, as illustrated in FIG. 11, and the inner peripheral panel portion 80 includes the main body portion 81 and partition wall constituent portions 82U and 82D forming the partition wall portion 30 arranged on both front and rear end sides of the main body portion 81. The inner peripheral panel portion 80 is a horizontally symmetrical strip-shaped body. The main body portion 81 forms the lower wall portion 22d of the upper expansion portion 22, the front wall portion 35c of the occupant protection portion 35, the upper wall portion 24c of the lower expansion portion 24, and the rear wall portion 26d of the front expansion portion 26. That is, the main body portion 81 of the inner peripheral panel portion 80 forms the peripheral wall 50 (upper wall portion 50a, lower wall portion 50b, front wall portion 50c, rear wall portion 50d) of the hollow portion 48 (gas storage portion 49).

The side wall panel portions 85L and 85R form a pair of left and right sides forming the left and right side surfaces of the airbag 15 when the expansion is completed. As illustrated in FIG. 12, the side wall panel portions 85L and 85R include the substantially rectangular side wall constituent portions 86L and 86R and substantially rectangular mounting portion constituent portions 90L and 90R extending from front upper end sides of the side wall constituent portions 86L and 86R. In the side wall constituent portion 86L in the side wall panel portion 85L, an outer peripheral region 87L, which is an outer peripheral edge side, forms the left wall portions 22e, 24e, 26e, and 35e in the upper expansion portion 22, the lower expansion portion 24, the front expansion portion 26, and the occupant protection portion 35 and the central side region 88L forms the closing panel portion 51L. Similarly, in the side wall constituent portion 86R in the side wall panel portion 85R, an outer peripheral region 87R forms the right wall portions 22f, 24f, 26f, and 35f in the upper expansion portion 22, the lower expansion portion 24, the front expansion portion 26, and the occupant protection portion 35 and the central side region 88R forms the closing panel portion 51R. The mounting portion constituent portions 90L and 90R in the side wall panel portions 85L and 85R form the left wall portion 18f and the right wall portion 18g in the mounting portion 18.

In the embodiment, the outer peripheral panel portion 65, the inner peripheral panel portion 80, the side wall panel portions 85L and 85R, the tether 60, 61, and 62, and the flap material 56 forming the airbag 15 are formed of a flexible woven fabric made of polyester yarn, polyimide yarn, or the like.

Then, as illustrated in FIGS. 4 to 9, the airbag 15 of the embodiment has a bag shape by sewing (joining) the corresponding edge portions of the upper panel 66, the lower panel 67, and the occupant side panel 69 (occupant side panel base material 72) in the outer peripheral panel portion 65, the inner peripheral panel portion 80, and the side wall panel portions 85L and 85R with sutures.

Specifically, a front edge 66a of the upper panel 66 is joined to a front upper edge 67a of the lower panel 67 and front edges 82a of the partition wall constituent portions 82U and 82D of the inner peripheral panel portion 80. A rear edge 66b of the upper panel 66 is joined to an upper edge 69a (an upper edge 73a of the central side region constituent portion 73 and the upper edges 77a of the protruding region constituent portions 77L and 77R) of the occupant side panel 69. A left edge 66c of the upper panel 66 is joined to an upper edge 86a of the side wall constituent portion 86L in the side wall panel portion 85L and a right edge 66d of the upper panel 66 is joined to an upper edge 86a of the side wall constituent portion 86R in the side wall panel portion 85R. A rear edge 67b of the lower panel 67 is joined to a lower edge 69b (a lower edge 73b of the central side region constituent portion 73 and the lower edges 77b of the protruding region constituent portions 77L and 77R) of the occupant side panel 69. A left edge 67c of the lower panel 67 is joined to a front edge 90a, a lower edge 90c, a rear edge 90b of the mounting portion constituent portion 90L in the side wall panel portion 85L and a front edge 86c and a lower edge 86b of the side wall constituent portion 86L in the side wall panel portion 85L. Similarly, a right edge 67d of the lower panel 67 is joined to the front edge 90a, the lower edge 90c, and the rear edge 90b of the mounting portion constituent portion 90R and the front edge 86c and the lower edge 86b of the side wall constituent portion 86R. A left edge 69c and a right edge 69d (outer edges 77c of the protruding region constituent portions 77L and 77R) of the occupant side panel 69 are respectively joined to rear edges 86d of the side wall constituent portions 86L and 86R in the side wall panel portions 85L and 85R. A left edge 81a and a right edge 81b of the main body portion 81 in the inner peripheral panel portion 80 are respectively joined to boundary parts between the outer peripheral regions 87L and 87R of the side wall constituent portions 86L and 86R in the side wall panel portions 85L and 85R and the central side regions 88L and 88R (see FIGS. 5 to 7). Further, in the partition wall constituent portions 82U and 82D in the inner peripheral panel portion 80, rear edges 82b are joined to each other, and in a state where a left edge 82c and a right edge 82d are overlapped with each other, those are joined to front upper end side regions of the side wall constituent portions 86L and 86R in the side wall panel portions 85L and 85R (see FIGS. 4 and 9).

The passenger seat airbag device M of the embodiment can be mounted on a vehicle in a following manner. The airbag 15 with the retainer 9 arranged inside is folded so that the airbag 15 can be accommodated in the case 12, and then the airbag 15 is accommodated in the case 12 in a state where the airbag 15 is wrapped in a breakable wrapping sheet (not illustrated). Next, the inflator 8 is connected to the case 12 together with the periphery edge of the inflow opening 19 of the airbag 15 by using the retainer 9. Then, the case 12 holding the folded airbag 15 and the inflator 8 is connected to the airbag cover 6 formed on the instrument panel 1 mounted on the vehicle.

In the passenger seat airbag device M of the embodiment, when it is mounted on a vehicle, the inflator 8 will operate in the event of a front collision, an oblique collision, or an offset collision of the vehicle. Therefore, as illustrated in FIGS. 14 and 15, the airbag 15 completes the expansion while inflowing the expansion gas into the inside to expand and protruding from the case 12. In the airbag 15 of the embodiment, the occupant protection portion 35 is configured to include the front collision restraint surface 42 placed on the center side in the left-right direction, the oblique collision restraint surfaces 43L and 43R arranged on both the left and right sides of the front collision restraint surface 42, and the restraint recess portions 44L and 44R arranged between the front collision restraint surface 42 and respective oblique collision restraint surfaces 43L and 43R. Therefore, in the event of a front collision of the vehicle, the front collision restraint surface 42 receives and protects the head MH of the occupant MP moving forward (see FIG. 15) and, in the event of an oblique collision or offset collision of the vehicle, the head MH of the occupant MP which moves diagonally forward is protected by allowing the head MH to enter the restraint recess portion 44L or 44R while being received by the oblique collision restraint surface 43L or 43R (see FIG. 16).

Then, in the airbag 15 of the embodiment, when the expansion is completed, if the airbag 15 is viewed from the lateral side in the left-right direction the regulating units (closing panel portion 51L and 51R) of which at least the upper edge side and the lower edge side are connected to the bag main body 16 side (upper expansion portion 22 and lower expansion portion 24) so as to straddle the hollow portion 48 are arranged at a plurality of horizontally symmetrical locations (two locations in the case of the embodiment) centered on the center of the bag main body 16 on the left-right directional side. Therefore, at the initial stage of expansion, it is possible to accurately suppress the development of the bag main body 16 in a wide range in the left-right direction so as to separate the upper expansion portion 22 and the lower expansion portion 24, and thus the bag main body 16 can be expanded by suppressing the swing almost evenly over a wide range in the left-right direction and the bag main body 16 which completes the expansion can stably protect the occupant MP. Further, in the airbag 15 of the embodiment, the bag main body 16 which expands by inflowing expansion gas into the inside is configured to have the expansion completed shape having a substantially square annular shape with the hollow portion 48 which penetrates the bag main body 16 substantially along the left-right direction and the rear expansion portion placed behind the hollow portion 48 when the expansion is completed is used as the occupant protection portion 35 capable of protecting the occupant MP. That is, in the airbag 15 of the embodiment, although the occupant protection portion 35 is arranged in a substantially plate shape separately from the mounting portion 18 to be attached to the case 12 side as an accommodation part, the upper end 35a side and the lower end 35 side of the occupant protection portion 35 are supported by the upper expansion portion 22 and the lower expansion portion 24 which are arranged substantially along the front-rear direction when the expansion is completed. Therefore, the occupant MP moving forward can be stably received by the occupant protection portion 35. Further, the upper expansion portion 22 and the lower expansion portion 24 which support the occupant protection portion 35 are connected to each other at a plurality of locations (two locations) separated in the left-right direction by the closing panel portions 51L and 51R as regulating members. Therefore, when the occupant protection portion 35 receives the occupant, the deformations that are separated from each other and that reduce the reaction force are also regulated in a wide range in the left-right direction. Therefore, even when it is configured to be separated from the mounting portion 18 and have the hollow portion 48 therebetween, the forward-moving occupant MP can be stably restrained by the occupant protection portion 35.

Therefore, in the airbag 15 of the embodiment, the swing can be suppressed almost evenly in a wide range in the left-right direction and the expansion can be completed.

In particular, in the airbag 15 of the embodiment, the upper expansion portion 22 and the lower expansion portion 24 have a configuration in which the front end 22a and 24a sides at the time of completion of expansion are supported by the instrument panel 1 and the windshield 4 arranged above the instrument panel 1 which are members on the vehicle body side. Therefore, the occupant protection portion 35 is supported by the members on the vehicle body side via the upper expansion portion 22 and the lower expansion portion 24, and thus the occupant MP moving forward can be stably protected by the occupant protection portion 35. Furthermore, when the airbag 15 when expansion is completed is viewed from the lateral side in the left-right direction, the upper expansion portion 22 and the lower expansion portion 24 are configured to be arranged substantially along the front-rear direction so as to be substantially orthogonal to the occupant protection portion 35 and the front expansion portion 26. In other words, since the upper expansion portion 22 and the lower expansion portion 24 are arranged substantially along an approach direction of the head MH of the occupant MP, the occupant protection portion 35, which receives the head MH (upper body) of the occupant MP, buckles when pressed forward, and thus it can stably absorb a kinetic energy of the occupant MP moving forward.

Further, in the airbag 15 of the embodiment, since the closing panel portions 51L and 51R as the respective regulating units are configured to connect the front edge sides and the rear edge sides to the bag main body 16 side in addition to the upper edge sides and the lower edge sides, each of the closing panel portions 51L and 51R is also connected to the front expansion portion 26 and the rear expansion portion (occupant protection portion 35) in addition to the upper expansion portion 22 and the lower expansion portion 24. Thus, the swing of the bag main body 16 at an initial stage of expansion can be more accurately suppressed the closing panel portions 51L and 51R as the regulating units.

Further, in the airbag 15 of the embodiment, since the peripheral edges of the closing panel portions 51L and 51R forming the regulating units are connected to the bag main body 16 side over the entire circumference so as to close the hollow portion 48. Therefore, the swing of the bag main body 16 at the initial stage of expansion can be more accurately regulated by the closing panel portions 51L and 51R.

In the embodiment, since the closing panel portions 51L and 51R are arranged at two locations so as to close the left end 48a side and the right end 48b side of the hollow portion 48, the closing panel portions 51L and 51R can be easily connected to the bag main body 16 side, and thus manufacturing is easy. In particular, in the airbag 15 of the embodiment, the closing panel portions 51L and 51R are formed from a part of the side wall panel portions 85L and 85R forming the bag main body 16. Therefore, it is not necessary to separately connect the closing panel to the bag main body, and thus it can be easily manufactured. Of course, the closing panel portion may be configured as a separate body from the base material forming the bag main body. Further, when such a point is not taken into consideration, the closing panel may be arranged at a position (intermediate part in the left-right direction in the hollow portion) further on an inner side than the left and right ends of the bag main body.

Furthermore, in the airbag 15 of the embodiment, the exhaust hole 37 capable of discharging the expansion gas G flowing into the bag main body 16 to the hollow portion 48 side is formed in the inner peripheral panel portion 80 forming the peripheral wall of the hollow portion 48 on an inner peripheral surface side in the bag main body 16 and, in the bag main body 16, the area surrounded by the inner peripheral panel portion 80 and the closing panel portions 51L and 51R is configured as the gas storage portion 49. Therefore, after the expansion of the bag main body 16 is completed, the expansion gas can be discharged into the gas storage portion 49 to expand the gas storage portion 49. Therefore, when receiving a forward-moving occupant MP by the occupant protection portion 35, by the gas storage portion 49 in a state where the internal pressure is increased, it is possible to secure the reaction force against the compression in the front-rear direction. Thus, the forward-moving occupant MP can be more stably restrained by the occupant protection portion 35 and the gas storage portion 49.

In particular, in the airbag 15 of the embodiment, the exhaust hole 37 is configured to be arranged in the area (front wall portion 35c of the occupant protection portion 35) forming the front surface side of the occupant protection portion 35 in the inner peripheral panel portion 80. Therefore, the exhaust hole 37 is formed on the side farthest from the mounting portion 18, that is, the inflator 8 (see FIG. 14), and thus exhaust of the expansion gas from the exhaust hole 37 during expansion of the bag main body 16 can be suppressed. As a result, after the bag main body 16 is surely expanded, the expansion gas can be discharged from the exhaust hole 37 into the gas storage portion 49. Of course, when such a point is not taken into consideration, the exhaust holes may be arranged in the inner peripheral panel portion in an area forming the lower surface side of the upper expansion portion, the upper surface side of the lower expansion portion, and the rear surface side of the front expansion portion.

Then, in the airbag 15 of the embodiment, the exhaust hole 37 is formed on the front surface side of the occupant protection portion 35. Therefore, even when the head MH of the occupant MP is received by the occupant protection portion 35, the expansion gas can be exhausted from the exhaust hole 37 into the gas storage portion 49. That is, the occupant protection portion 35 receives the head MH of the occupant MP while exhausting the expansion gas from the exhaust hole 37. As a result, the head MH of the occupant MP can be accurately received with the occupant protection portion 35 having an appropriate cushioning property. Further, in the airbag 15 of the embodiment, the occupant protection portion 35 has the restraint recess portions 44L and 44R which allow the head MH of the occupant MP moving diagonally forward to enter and restrain the head and the restraint recess portions 44L and 44R are configured to connect the tips (front ends 43*a*) of the recesses to the inner peripheral surface (peripheral wall 50 of gas storage portion 49, front wall portion 35*c* of occupant protection portion 35) of the hollow portion 48. Therefore, even when the peripheral edge portions of the restraint recess portions 44L and 44R which allow the head MH of the occupant MP to enter and restrain the head MH are bottomed out, the gas storage portion 49 is arranged in front of the occupant protection portion 35. In other words, the expansion portion which is expanded as a separate body from the bag main body is arranged in front of the occupant protection portion 35. Therefore, due to the reaction force generated by such an expansion portion (gas storage portion 49), the head MH of the occupant MP which enters the restraint recess portion 44L or 44R can be received with favorable cushioning properties.

Further, in the airbag 15 of the embodiment, the intake hole portion 53 capable of taking in the outside air A into the gas storage portion 49 when the bag main body 16 is developed and expanded is formed in the closing panel portion 51L arranged on the left side. Therefore, when the airbag 15 is developed and expanded, the outside air A can be stably taken into the gas storage portion 49, and thus the gas storage portion 49 can be reliably suppressed from being in a vacuum state. When such a point is not taken into consideration, the closing panel portion may be configured so that the intake hole portion is not provided. Since the airbag is formed by sewing the peripheral edge of the base material with sutures, outside air can enter through holes generated in seams even when the intake hole portions are not provided. Therefore, although the gas storage portion is not in a complete vacuum state, it is preferable to provide an intake hole portion because the outside air can be surely taken into the gas storage portion.

Furthermore, in the airbag 15 of the embodiment, the intake hole portion 53 is provided with the check valve mechanism 554 capable of suppressing the discharge of gas to the outside. Therefore, after the expansion of the bag main body 16 is completed, the expansion gas discharged into the gas storage portion 49 through the exhaust hole 37 can be suppressed from being exhausted to the outside of the gas storage portion 49, and thus it is possible to stably maintain the internal pressure of the gas storage portion 49. Of course, when such a point is not taken into consideration, the check valve mechanism may not be provided in the intake hole portion and the closing panel portion may simply be provided with an opening as the intake hole portion. In the airbag 15 of the embodiment, the intake hole portion 53 is arranged not at the center of the closing panel portion 51L but at a position near the lower front end. Therefore, as compared with the case where the intake hole portion is provided in the center of the closing panel portion, it is less affected by the tension generated in the closing panel portion and can be opened and closed stably. Of course, the arrangement position of the intake hole portion is not limited to the embodiment. Further, in the embodiment, the intake hole portion 53 is formed only in the closing panel portion 51L on the left side, but of course, the intake hole portion 53 may be arranged not only on the left side but also on the closing panel portion on the right side.

In the airbag 15 of the embodiment, the closing panel portions 51L and 51R which close the left end 48*a* side and the right end 48*b* side of the hollow portion 48 are used as the regulating units. However, when it is not considered to use the hollow portion as the gas storage portion, each of the regulating units may be composed of a strip-shaped sheet body, arranged substantially along the up-down direction so as to straddle the hollow portion, and connected to the upper expansion portion and the lower expansion portion. Further, each of the regulating units may be composed of a cross-shaped sheet body, and may be connected to the front expansion portion and the rear expansion portion (occupant protection portion) addition to the upper expansion portion and the lower expansion portion. Further, the number of regulation units is not limited to two, and when the positions are horizontally symmetrical, for example, the regulation units may be arranged at three locations including the center in the left-right direction. Also, of course, it may be configured to be arranged at four or more locations. Of course, the regulating units need not be arranged on both left and right end sides of the hollow portion.

In the airbag 15 of the embodiment, the expansion gas is also allowed to flow into the hollow portion 48 in the expansion completed state and, when this hollow portion 48 is used as the expansion part, the airbag 15 can also be seen as a configuration including a substantially square cylindrical shaped primary expansion portion having a hollow portion penetrating in the center and a secondary expansion portion composed of the hollow portion.

In the embodiment, the passenger seat airbag 15 is taken as an example for explanation, but the airbag to which the invention can be applied is not limited to the airbag for the passenger seat.

What is claimed is:

1. An airbag, which is folded and accommodated in front of an occupant seated on a seat in a vehicle and is configured to allow expansion gas to flow inside and be developed and expanded so as to protrude from an accommodation part toward a rear side to be able to protect the occupant, the airbag comprising:
    a bag main body configured to be expanded by inflowing expansion gas into the inside; and
    a plurality of regulating units configured to regulate an expansion completed shape of the bag main body, wherein:
    the bag main body has an expansion completed shape as a substantially square cylindrical shape, where a hollow portion which penetrates substantially along a left-right direction is provided and a circumference of the hollow portion is surrounded by an upper expansion portion and a lower expansion portion arranged substantially along a front-rear direction on both upper and lower sides and a front expansion portion and a rear expansion portion arranged substantially along an up-down direction on both front and rear sides, and the rear expansion portion arranged on an occupant side when expansion is completed is defined as an occupant protection portion capable of protecting the occupant and a mounting portion to be attached to an accommodation part side is arranged on a front end side when the expansion is completed;

the regulating units are arranged at a plurality of horizontally symmetrical locations centered on a center of the bag main body on a left-right directional side and each of the regulating units is configured to straddle the hollow portion when viewed from a lateral side in the left-right direction and at least an upper edge side and a lower edge side are connected to a bag main body side; and the upper expansion portion is configured such that a part on the front end side communicating with the mounting portion and the front expansion portion has a narrow width in the left-right direction and a part on the rear end side communicating with the occupant protection portion has a wide width in the left-right direction.

2. The airbag according to claim 1, wherein
each of the regulating units is configured to connect a front edge side and a rear edge side to the bag main body side in addition to the upper edge side and the lower edge side.

3. The airbag according to claim 2, wherein
each of the regulating units is configured as a closing panel whose peripheral edge is connected to the bag main body side over an entire circumference so as to close the hollow portion.

4. The airbag according to claim 3, wherein
the closing panels are arranged at two locations so as to close both left and right end sides of the hollow portion.

5. The airbag according to claim 4, wherein:
in the bag main body, an exhaust hole capable of discharging the expansion gas flowing into the bag main body to a hollow portion side is formed in an inner peripheral panel portion forming a peripheral wall of the hollow portion on an inner peripheral surface side; and in the bag main body, an area surrounded by the inner peripheral panel portion and the closing panel is configured as a gas storage portion.

6. The airbag according to claim 5, wherein
the exhaust hole is arranged in an area forming a front surface side of the occupant protection portion in the inner peripheral panel portion.

7. The airbag according to claim 5, wherein
an intake hole portion capable of taking in outside air into the gas storage portion when the bag main body is developed and expanded is formed on at least one of the left and right closing panels.

8. The airbag according to claim 7, wherein
the intake hole portion is provided with a check valve mechanism capable of suppressing gas discharge to the outside.

* * * * *